United States Patent
Hickman

(10) Patent No.: US 8,601,378 B2
(45) Date of Patent: Dec. 3, 2013

(54) CUSTOMIZED PRESENTATIONS ASSOCIATED WITH A SOCIAL MEDIA APPLICATION BASED ON RELATIONSHIPS

(75) Inventor: Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 15 days.

(21) Appl. No.: 13/224,025

(22) Filed: Sep. 1, 2011

(65) Prior Publication Data

US 2012/0084667 A1    Apr. 5, 2012

Related U.S. Application Data

(63) Continuation of application No. 12/895,173, filed on Sep. 30, 2010.

(51) Int. Cl.
*G06F 3/041* (2006.01)

(52) U.S. Cl.
USPC .......................................... 715/751; 715/766

(58) Field of Classification Search
USPC ................................................. 715/751, 766
See application file for complete search history.

(56) References Cited

U.S. PATENT DOCUMENTS

| | | | |
|---|---|---|---|
| 2005/0198125 | A1 | 9/2005 | Macleod et al. |
| 2005/0289474 | A1* | 12/2005 | Master et al. ................. 715/765 |
| 2009/0204601 | A1* | 8/2009 | Grasset ............................ 707/5 |
| 2010/0131385 | A1 | 5/2010 | Harrang et al. |

FOREIGN PATENT DOCUMENTS

| | | |
|---|---|---|
| KR | 2009072575 | 7/2009 |
| KR | 20100103735 | 9/2010 |

OTHER PUBLICATIONS

Search Report and Written Opinion for International Application No. PCT/US11/054050, mailed Feb. 27, 2012, 10 pages.
Non-Final Office Action for U.S. Appl. No. 12/895,173, mailed Jan. 7, 2013, 25 pages.

* cited by examiner

*Primary Examiner* — Andrea Leggett
(74) *Attorney, Agent, or Firm* — Patent Law Works LLP

(57) ABSTRACT

According to a general aspect, a method can include receiving a request, triggered via a consumer account, to access, using a social media application, a plurality of sharer content. The sharer content can be associated with a sharer account using the social media application. The method can include retrieving, in response to the request, a consumer value and a relationship value. The consumer value can represent an interaction with the social media application via the consumer account and the relationship value can characterize a relationship between a consumer identifier of the consumer account and a sharer identifier of the sharer account. The method can include selecting a subset of sharer content from the plurality of sharer content based on a combination of the consumer value and the relationship value, and can include defining a portion of a presentation customized for the consumer account using the selected subset of sharer content.

19 Claims, 12 Drawing Sheets

| User Identifiers 610 | Relationship Target Identifiers 620 | Relationship Strength Values 632 | Relationship Type Values 634 |
|---|---|---|---|
| S1 | V1 | Tier2 | Family |
| | V2 | Tier1 | Acquaintance |
| | V3 | — | — |
| | V4 | Tier1 | Family |
| V1 | V5 | Tier2 | Business |
| | V6 | Tier0 | Acquaintance |
| ... | ... | ... | ... |
| V5 | S1 | Tier0 | Acquaintance |

605 ← (arrow to table)
Relationship Values 630 → (Relationship Strength Values 632, Relationship Type Values 634)

FIG. 6B

CUSTOMIZED PRESENTATIONS ASSOCIATED WITH A SOCIAL MEDIA APPLICATION BASED ON RELATIONSHIPS

RELATED APPLICATION

This application claims priority to, and is a continuation of, U.S. patent application Ser. No. 12/895,173, filed on Sep. 30, 2010, entitled, "COMPOSITION OF CUSTOMIZED PRESENTATIONS ASSOCIATED WITH A SOCIAL MEDIA APPLICATION," which is incorporated herein by reference in its entirety.

TECHNICAL FIELD

This description relates to presentation of content associated with a social media application.

BACKGROUND

Several known social media applications are available for sharing of content (e.g., image content, audio content, textual content) through, for example, the Internet. A user of one of these known social media applications can share content via the social media application with another user of the social media application. A user sharing content using the social media application can be referred to as a sharer, and a user consuming content using the social media application can be referred to as a consumer. Because the volume of the content shared via the social media application by the sharer can be relatively large and/or diverse, sifting through the content to pick and choose content that would be of interest to the consumer can be unpleasant and/or time-consuming for the consumer. The sifting may be undesirable because, for example, large portions of the content shared by the sharer through the social media application may not be relevant to the consumer or duplicative of other content already consumed by the consumer. Thus, a need exists for systems, methods, and apparatus to address the shortfalls of present technology and to provide other new and innovative features.

SUMMARY

According to one general aspect, a tangible computer-readable storage medium can store code representing instructions that when executed are configured to cause a processor or a computer system to perform a process. The code can include code to receive a request, associated with a consumer account, to access, using a social media application, a plurality of sharer content. The sharer content can be associated with a sharer account using the social media application. The code can include code to retrieve, in response to the request, a plurality of consumer values representing a plurality of interactions with the social media application via the consumer account during a time period occurring before the request is received, and code to select a subset of sharer content from the plurality of sharer content based on the plurality of consumer values. The code can include code to define a portion of a presentation customized for execution via the consumer account based on the plurality of consumer values and using the selected subset of sharer content.

According to another general aspect, a tangible computer-readable storage medium can store code representing instructions that when executed are configured to cause a processor to perform a process. The code can include code to receive a request, via a consumer account, to access using a social media application a plurality of sharer content associated with a sharer account using the social media application. The code can include code to retrieve, in response to the request, a plurality of consumer values representing a plurality of interactions with the social media application, the plurality of interactions being associated with the consumer account during a time period occurring before the request is received, and code to define a first portion of a presentation based on the plurality of consumer values and a first portion of sharer content from the plurality of sharer content. The code can also include code to detect an interaction, occurring via the consumer account, with the first portion of the presentation, and code to define a second portion of the presentation based on a combination of the plurality of consumer values, a second portion of sharer content from the plurality of sharer content, and the interaction with the first portion of the presentation.

According to yet another general aspect, a computer system can include instructions stored on a tangible computer-readable storage medium. The computer system can include a presentation module configured to receive a request, triggered via a consumer account, to access using a social media application a plurality of sharer content associated with a sharer account of the social media application. The computer system can include a relationship module configured to access, in response to the request, a relationship value representing a type of relationship between a consumer identifier of the consumer account and a sharer of the sharer account within a social network associated with the sharer account. The computer system can also include a presentation composition module configured to select a subset of sharer content from the plurality of sharer content based on the relationship value, and configured to define a configuration of the subset of sharer content within a portion of a presentation based on the relationship value.

According to yet another general aspect, a method can include receiving a request, triggered via a consumer account, to access, using a social media application, a plurality of sharer content. The sharer content can be associated with a sharer account using the social media application. The method can also include retrieving, in response to the request, a consumer value and a relationship value where the consumer value can represent an interaction with the social media application via the consumer account and where the relationship value can characterize a relationship between a consumer identifier of the consumer account and a sharer identifier of the sharer account. The method can also include selecting a subset of sharer content from the plurality of sharer content based on a combination of the consumer value and the relationship value, and can include defining a portion of a presentation customized for the consumer account using the selected subset of sharer content.

The details of one or more implementations are set forth in the accompanying drawings and the description below. Other features will be apparent from the description and drawings, and from the claims.

BRIEF DESCRIPTION OF THE DRAWINGS

FIG. 6B is a diagram that illustrates a database with information associated with the relationships within the social network shown in FIG. 6A.

DETAILED DESCRIPTION

Figure 1:
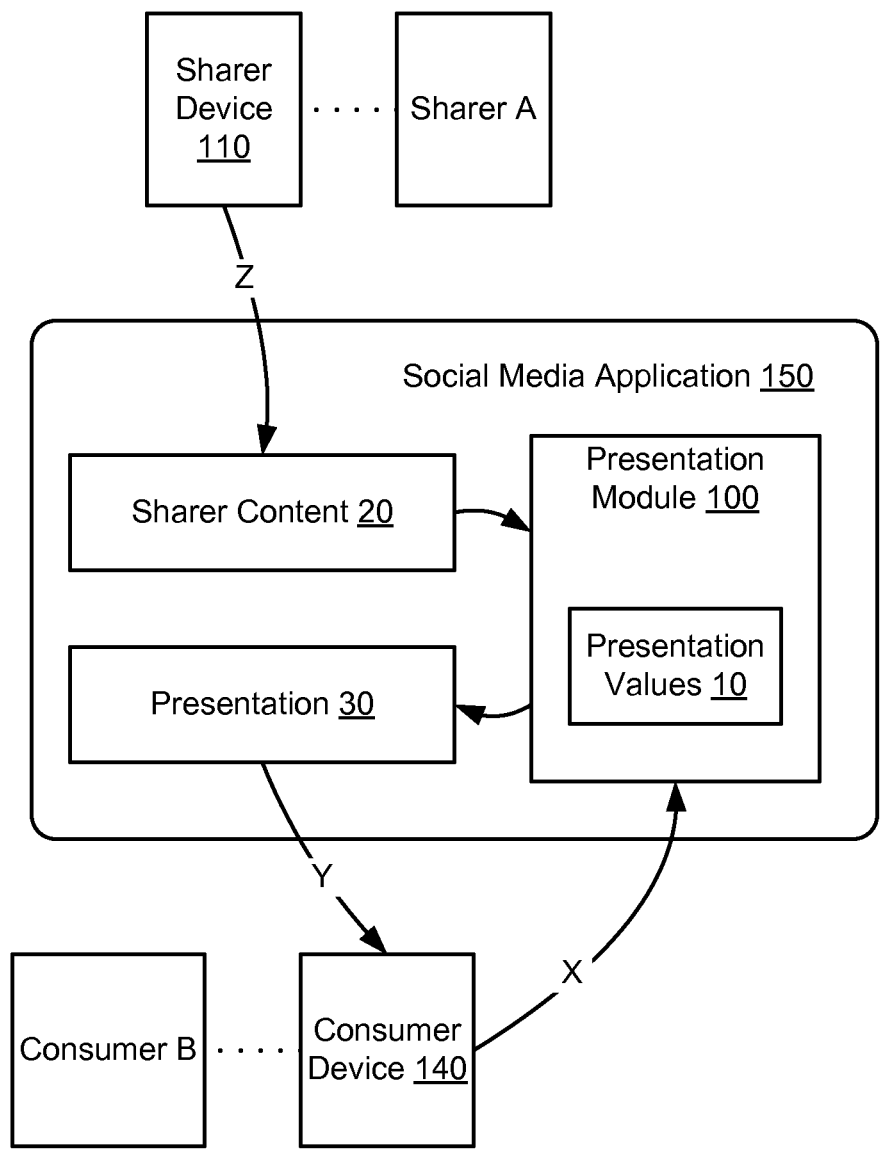
FIG. 1 is a block diagram that illustrates a presentation module of the social media application configured to define a presentation based on sharer content.

FIG. 1 is a block diagram that illustrates a presentation module 100 of the social media application 150 configured to define a presentation 30 based on sharer content 20. The presentation 30 can be requested (as represented by line X) from the presentation module 100 by a consumer B using a consumer device 140 via the social media application 150. After the presentation 30 has been defined, the presentation can be sent (as represented by line Y) for consumption (e.g., viewing, listening, storing) by the consumer B via the consumer device 140 (e.g., via a display of the consumer device 140). In some embodiments, or more functions of the presentation module 100 can be integrated into the social media application 150 as functions of the social media application 150. In some embodiments, the social media application 150 can be referred to as a social media system and can be part of a social media platform.

The sharer A and the consumer B are referred to respectively as a sharer and as a consumer based on their respective perspectives in the transactions shown in FIG. 1. Thus, the sharer A and the consumer B are each users of the social media application 150, but are referred to respectively as a sharer and as a consumer based on their respective roles/participation within the transactions shown in FIG. 1. Accordingly, in some embodiments, the sharer A could participate as a consumer and the consumer B could participate as a sharer in a different transaction.

The consumer B is a user of the social media application 150 that can be referred to as a consumer because the consumer is requesting content for consumption (e.g., viewing). In this embodiment, the consumer B is specifically requesting to view sharer content 20 associated with the sharer A. The sharer A is a user of the social media application 150 that can be referred to as the sharer because the content (i.e., the sharer content 20) to be consumed by the consumer B in the presentation 30 is being shared (e.g., being made available, uploaded, posted) by the sharer A. In some embodiments, the sharer A can be the subject of the sharer content 20. In some embodiments, the sharer A and/or the consumer B can be, for example, a person, an entity, a group, etc., authorized to use the social media application 150. In some embodiments, authorization to use the social media application 150 (e.g., access content associated with the sharer A using the social media application 150) may be limited by, for example, the sharer A.

In some embodiments, a user (such as the sharer A and/or the consumer B) of the social media application 150 may have a user account through which the user may access the social media application 150. In some embodiments, a first user may access, using the account of the first user, content associated with an account of a second user. In some embodiments, the first user may be able to access the content associated with the account of the second user only if authorized (e.g., authorized by the second user) to do so. In some embodiments, a user account associated with the sharer A can be referred to as a sharer account, and a user account associated with the consumer B can be referred to as a consumer account. In some embodiments, an account of the user associated with the social media application 150 can be referred to as a social media account (or as an account). Although actions (e.g., interactions) of a user (e.g., a consumer, a sharer) may not be explicitly described as being performed through or associated with (e.g., attributed to) a social media account, any action (e.g., transaction) of a user described herein may be associated with the social media account of the user (and information related to the action can also be associated with the social media account). For example, a request triggered by a user, or content accessed by the user, may be associated with a social media account of the user through which these actions are performed.

In some embodiments, the sharer A and/or the consumer B may optionally limit access to their respective accounts (e.g., content associated an account, a user profile associated with an account, etc.) using the social media application 150. For example, in some embodiments, the consumer B (via an account of the consumer B) may request access to an account of the sharer A. The sharer A may optionally grant the consumer B access to (e.g., access to at least a portion of) the account of the sharer A, or optionally deny the consumer B access to the account of the sharer A. In some embodiments, the sharer A may optionally limit (or allow) access to the account of the sharer A so that a user such as consumer B may not be permitted to request access to the account of the sharer A. As another example, the sharer A (via an account of the sharer A) may invite consumer B (via an account of the consumer B) to access at least a portion (e.g., a portion of content) of the account of the sharer A. The consumer B may optionally accept the invitation to access the account of the sharer A, or optionally reject the invitation to access the account of the sharer A. In some embodiments, the consumer B may optionally limit (or allow) access to the account of the consumer B, so that a user such as sharer A may not even be permitted to invite consumer B to access the account of the sharer A.

The presentation 30 can be a presentation that is customized (e.g., customized in a specified configuration) by the presentation module 100 for consumption by the consumer B via the consumer device 140. Specifically, the presentation 30 can be customized in a targeted fashion for consumption by the consumer B via the consumer device 140 in response to the request triggered by the consumer B. Thus, the presentation 30 may not be a predefined presentation, but may instead be a presentation uniquely defined in response to the request (represented by line X) triggered by the consumer B.

The presentation 30 can include various aspects that can each be customized (e.g., customized with specified sharer content 20 and/or a specified format that has a visual configuration and/or audio configuration) for consumption by the consumer B. For example, a format of the presentation 30, the sharer content 20 (or other content) included in the presentation 30, and/or so forth can be customized for the consumer B.

The presentation 30 (e.g., the content of the presentation 30, the format of the presentation 30, etc.) can be customized by (e.g., selected by, defined by) the presentation module 100 based on one or more presentation values 10. The presentation values 10 can include various types of values (not shown in FIG. 1) that can be received from (e.g., acquired from) and/or defined based on information from various sources. For example, the presentation values 10 can include, or can be, consumer values, relationship values, sharer values, content values, third-party values, and/or so forth. Because the consumer values, the sharer values, and the third-party values, are associated with different users (i.e., consumers, sharers, and third-party users) of the social media application 150, these values can collectively (or individually) be referred to as user values. More details related to presentation values and customization of presentations (e.g., customization in a specified configuration) based on presentation values are discussed in connection with the figures below.

The foregoing presentation values 10, which can include consumer values, relationship values, sharer values, content values, etc., can be based on data collected upon user consent. In some implementations, a user (e.g., sharer A, consumer B) can be prompted to explicitly allow data collection. In some implementations, a consumer value (which is a type of presentation value 10) associated with a consumer can be based on data collected with permission of the consumer. In some embodiments, a consumer may optionally prevent use of the consumer value.

The sharer content 20 can be referred to as sharer content because the sharer content 20 is associated with a social media account of the sharer A. The sharer content 20 can be made available to the presentation module 100 (and associated with the sharer account) by a sharer using a sharer device 110 via the social media application 150. In some embodiments, the sharer content 20 can be from content included in, or associated with, applications (e.g., applications associated with a platform) independent from the social media application 150. Thus, content from applications interfacing with the social media application 150 can be included in the sharer content 20. For example, at least a portion (e.g., a subset) of the sharer content 20 can be content that is linked into the sharer content 20 (and associated with the sharer account) from another source (e.g., from an account of the sharer A with another content source). In some embodiments, the sharer content 20 can include content from another social media application (not shown) and can be included in the sharer content 20 (and associated with the social media account of the sharer A) by a user other than the sharer A (e.g., the consumer B, a third-party user).

The social media application 150 can be, or can include, any type of hardware and/or software configured to facilitate users of the social media application 150 to interact and/or share content. A user can share content by, for example, uploading (e.g., posting) the content via the social media application 150 to a location where the content may be accessed by another user via the social media application 150. In some embodiments, the sharing of content can be referred to as generation of content. In some embodiments, the social media application 150 can be a collaborative environment through which one or more users (such as sharer A and/or consumer B) can engage in collaborative work. In some embodiments, the social media application 150 can include one or more search engines, social network services, forums, instant messaging/chat applications, virtual environments, peer-to-peer communications applications, and/or so forth. In some embodiments, the social media application 150 can include, or can be based on, one or more open application programming interfaces (APIs).

Although not shown, in some embodiments the social media application 150 (or portions thereof) can be configured to operate within, for example, a data center (e.g., a cloud computing environment), a computer system, one or more server/host devices, and/or so forth. In some embodiments, the social media application 150 (or portions thereof) can be configured to operate within a network. Thus, the social media application 150 can be configured to function within various types of network environments that can include one or more client devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

The sharer device 110 and/or the consumer device 140 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), a host device, and/or so forth. The sharer device 110 and/or the consumer device 140 can be configured to operate based on one or more platforms (e.g., one or more similar or different platforms) that can include one or more types of hardware, software, firmware, operating systems, runtime libraries, and/or so forth.

In some embodiments, the sharer device 110 and/or the consumer device 140 can represent a cluster of devices (e.g., a server farm). In such an embodiment, the functionality and processing of the sharer device 110 and/or the consumer device 140 can be distributed to several devices of the cluster of devices.

Figure 2:
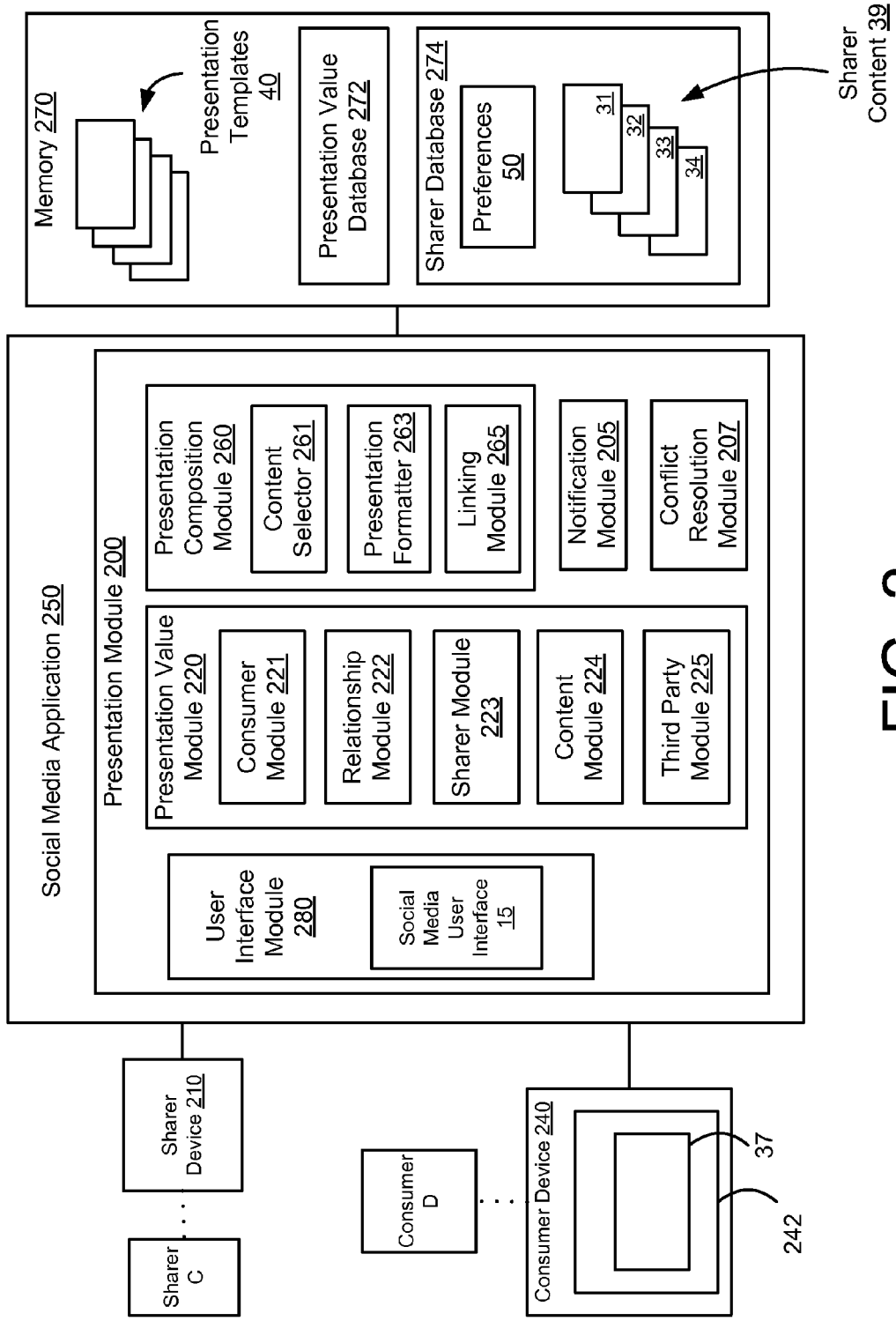
FIG. 2 is a block diagram that illustrates a presentation module configured to define at least a portion of a presentation based on sharer content.

FIG. 2 is a block diagram that illustrates a presentation module 200 configured to define at least a portion of a presentation 37 based on sharer content 39. The presentation module 200 is included as a component within a social media application 250. In some embodiments, the social media application 250 can be configured to operate within, or can be part of, for example, a portion of a data center, a computing device, and/or so forth. As shown in FIG. 2, the sharer content 39, which includes sharer content 31 through 34, is stored in a sharer database 274. In this embodiment, the presentation 37 is executed at (e.g., displayed within, rendered within) a display 242 of a consumer device 240 for consumption by consumer D.

As shown in FIG. 2, the presentation module 200 includes three main modules—a presentation value module 220, a presentation composition module 260, and a user interface module 280. The presentation value module 220 is configured to manage (e.g., acquire, define, send) presentation values that can be used by the presentation composition module 260 to define the presentation 37. Thus, the presentation composition module 260 can be configured to define the presentation 37 based on presentation values received from the presentation value module 220. The user interface module 280 is configured to manage (e.g., send, manipulate, trigger execution of) a social media user interface 15 through which users such as the sharer C and/or the consumer D can access (e.g., use) the social media application 250. For example, the sharer C can access the social media application 250 via the social media user interface 15 using the sharer device 210.

The social media user interface 15 can be, for example, a browser-based user interface that includes various buttons, links, controls, services, and/or so forth that can be used by a user (such as consumer D) to access the social media application 250. The social media user interface 15 can be rendered within a device of the user so that the user can access one or more functions of the social media application using the social media user interface 15. For example, the consumer D can, using the consumer device 240, access the social media user interface 15 served by the user interface module 280 to a browser application of the consumer device 240. The consumer D can then use the social media user interface 15 to trigger one or more functions associated with the social media application 250. In this embodiment, a request to access the sharer content 39 associated with the sharer C can be defined in response to an interaction of the consumer D with the social media user interface 15 using a consumer device 240. In response to the request, the presentation 37 can be defined by the presentation module 200 and can be sent for execution (e.g., for processing) within the social media user interface 15 so that the presentation 37 can be consumed by the consumer D using the consumer device 240.

As another example, the sharer C can invite the consumer D to access the sharer content 39 associated with the sharer C via the social media user interface 15. In response to the consumer D accepting the invitation, the presentation 37 can be defined by the presentation module 200 and can be sent for execution (e.g., for processing) within the social media user interface 15 so that the presentation 37 can be consumed by the consumer D using the consumer device 240.

In some embodiments, a request for the presentation 37 can be defined in response to the consumer D requesting access to at least a portion of the sharer content 39 associated with an account (e.g., a social media account) of the sharer C. Thus, a request for the presentation 37 can be automatically defined in response to the consumer D requesting access to at least a portion of the sharer content 39. In some embodiments, a request for the presentation 37 can be manually triggered by the consumer D. For example, a request for the presentation 37 can be defined by the consumer D using, for example, a button, or other request triggering mechanism, included in the social media user interface 15.

As shown in FIG. 2, the presentation value module 220 includes a consumer module 221 configured to manage (e.g., define, acquire) one or more consumer values. A consumer value can represent one or more interactions of the consumer D with the social media application 250 (or another application independent from the social media application 250). In some embodiments, the interaction(s) can be triggered via the consumer device 240 (or another consumer device). For example, a consumer value (or collection of consumer values) can represent a behavior of the consumer D with respect to the social media application 250 (or another application independent from the social media application 250).

In some embodiments, a consumer value can represent a usage behavior (e.g., a usage pattern, a usage level) of the social media application 250 by the consumer D. For example, a consumer value (or collection of consumer values) can represent a frequency of access (e.g., during a time period) to the social media application 250. As a specific example, a consumer value can represent parameters related to accessing of the social media application 250 within a time period (e.g., before a request for the presentation 37). In some embodiments, the consumer value can represent when (e.g., a time) the social media application 250 was accessed and/or the type of content accessed. In some embodiments, a consumer value can indicate the type of content (e.g., an audio file, an image file) and/or a subject matter (e.g., photographs of people, photographs of places, music by particular group) of the content that has been consumed by and/or shared by (e.g., stored by, uploaded by, posted by) the consumer D using the social media application 250 (within a time period). In some embodiments, a consumer value can reflect feedback (e.g., posted a comment) related to content (e.g., the sharer content 39, third party content, content posted by the consumer, etc.) consumed by the consumer D via the consumer device 240 using the social media application 250. In some embodiments, one or more consumer values can indicate a geo-location (e.g., using global positioning system (gps) coordinates) and/or an identifier of a device (e.g., a media access control (MAC) address) when content is consumed and/or shared using the social media application 250.

As shown in FIG. 2, the presentation value module 220 includes a relationship module 222 configured to manage (e.g., define, acquire) one or more relationship values. A relationship value can present a relationship (or characteristic of a relationship) between the sharer C and the consumer D. For example, in some embodiments, a relationship value can represent whether the sharer C and the consumer D have a close relationship or do not have a close relationship (e.g., an attenuated relationship). In some embodiments, relationship value can represent a type of relationship between the sharer C and the consumer 214. For example, a relationship value can indicate that the sharer C and the consumer 214 have a business relationship, are close friends, are merely acquaintances, or are members of the same immediate family.

In some embodiments, relationship module 222 can be configured to define one or more relationship values based on a social network including the sharer C and the consumer D. In some embodiments, the relationship value can be defined based on an analysis of a social network originating with the sharer C and/or a social network originating with the consumer D. In some embodiments, the social network can include many users of the social media application 250 including the sharer C and the consumer D. For example, the relationship module 222 can be configured to analyze a number of relationships (e.g., connections) between the sharer C and users connected to the consumer D. These relationships can be an indicator of the closeness of the relationship between the consumer D and the sharer C. More details related to relationship values and relationship values defined based on a social network are described in connection with, for example, FIGS. 6A and 6B.

As shown in FIG. 2, the presentation value module 220 includes a sharer module 223 configured to manage (e.g., define, acquire) one or more sharer values. A sharer value can represent one or more interactions of the sharer C with the social media application 250 (or another application independent from the social media application 250). In some embodiments, the interaction(s) can be triggered via the sharer device 210 (or another sharer device). For example, a sharer value (or collection of sharer values) can represent a behavior of the sharer C with respect to the social media application 250 (or another application independent from the social media application 250).

In some embodiments, a sharer value can represent a usage behavior (e.g., a usage pattern, a usage level) of the social media application 250 by the sharer C. For example, a sharer value (or collection of sharer values) can represent a frequency of access (e.g., during a time period) to the social media application 250. As a specific example, a sharer value can represent a time that the sharer C has accessed the social media application 250 within a time period (e.g., before a request for the presentation 37). These types of sharer values can be indicators of significant life events of the sharer C such as a wedding, a vacation, etc. In some embodiments, the sharer value can represent when (e.g., a time) the social media application 250 was accessed and/or the type of content accessed. In some embodiments, a sharer value can indicate the type of content (e.g., an audio file, an image file) and/or a subject matter (e.g., photographs of people, photographs of places, music by particular group) of the content that has been consumed by and/or shared by (e.g., stored by, uploaded by, posted by) the sharer C using the social media application 250 (within a time period). The content can be the sharer content 39 of the sharer C (e.g., associated with a social media account of the sharer C) and/or can be content associated with one or more users other than the sharer C (e.g., associated with a social media account of the other users). In some embodiments, a sharer value can reflect feedback (e.g., posted a comment) related to content (e.g., the sharer content 39, third party content, content posted by the consumer, etc.) consumed by the sharer C via the consumer device 240 using the social media application 250. In some embodiments, one or more sharer values can indicate geo-location of the consumer D (e.g., using global positioning system (gps) coordinates) and/or an identifier of a device (e.g., a media access control (MAC) address) when the sharer C is consuming content and/or sharing content using the social media application 250.

As shown in FIG. 2, the presentation value module 220 includes a content module 224 configured to manage (e.g., define, acquire) one or more content values. A content value can represent (or can be an indicator of), for example, an analysis of one or more portions of content associated with the social media application 250. For example, a content value can represent a characteristic of a portion of the sharer content 39 such as a type of the sharer content (e.g., whether the sharer content is an image file or an audio file), and/or so forth. In some embodiments, the content value can indicate that a portion of the sharer content 39 is associated with (e.g., classified within) a particular contextual category based on a subject matter of the sharer content. For example, content value can indicate a portion of the sharer content 39 is related to a contextual category such as a category that reflects an event in the life of a user, a vacation category, a scenery category, a family event category (e.g., a wedding event category), a business category, an animal category, and/or so forth. In some embodiments, content value can indicate a time that a portion of the sharer content 39 was stored in the sharer database 274, a time that the portion of the sharer content 39 was created, etc. In some embodiments, a content value can represent that a particular portion of the sharer content 39 is related to a contextual category.

In some embodiments, the content module 224 can be configured to define one or more content values based on analysis of more portions of content such as the sharer content 39. For example, the content module 224 can be configured to analyze an image and/or can be configured to analyze metadata associated with the image to determine the subject matter of the image. The content module 224, using information about the subject matter of the image, can define a content value representing the subject matter of the image. In some embodiments, the content module 224 can be configured to associate one or more portions of content with a contextual category and/or can be configured to rank the relevance of content with respect to other content. In some embodiments, the content module 224 can be configured to analyze the subject matter of textual content and/or metadata associated with content using, for example, natural language processing (NLP) techniques. More details related to content values and details related to the analysis of content to define content values are described herein, for example, in connection with FIG. 7.

A third-party value can represent one or more interactions of a third-party user (not shown) with the social media application 250 (or another application independent from the social media application 250). In some embodiments, the third-party user can be a user of social media application 250 that is not the sharer C or the consumer D. One or more third-party values can be similar to (or the same as) the consumer values and/or the sharer values, but with respect to a third-party user. For example, a third-party value can represent a usage behavior of a third-party user, a type of content and/or a subject matter of the content consumed by and/or shared by the third-party user, and/or so forth.

In some embodiments, the information represented by a presentation value may or may not overlap with information represented by another presentation value. For example, a content value may provide information that is similar to or the same as information provided by a consumer value. In some embodiments, the information represented by different presentation values can be different.

In some embodiments, one or more presentation values defined by the presentation value module 220 can be stored in the memory 270. For example, the presentation values can be stored in a presentation value database 272.

Presentation values can be defined and stored in the presentation value database 272 before a request is received for a presentation from a consumer (such as the consumer D) so that the presentation value(s) can be retrieved rather than defined in response to the request. For example, when a change in a relationship with the sharer C is detected by the relationship module 222, the relationship module 222 can be configured to define a relationship value representing the change in the relationship. In some embodiments, the content module 224 can be configured to analyze content as the content is being uploaded using the social media application 250 so that content values associated with the content can be defined for later use by the presentation composition module 260. In some embodiments, the consumer module 221 can be configured to define one or more consumer values in response to interactions of the consumer D with the social media application 250 as the interactions are occurring (or shortly after they have occurred) so that the consumer value(s) can be used by the presentation composition module 260 to define a presentation such as presentation 37.

The presentation values described above are discussed by way of example only and may not be inclusive of every type of presentation value that can be used by a presentation module such as presentation module 200 to define a presentation such as presentation 37. More details related to customization of presentations such as presentation 37 based on presentation values, such as those discussed above, are discussed below and in connection with the remaining figures.

The sharer content 39 can include, or can be, for example, various types of content. For example, the sharer content 39 can include, or can be, image content (e.g., a Joint Photographic Experts Group (JPEG) file), audio content (e.g., a .wav file), textual content (e.g., an American Standard Code for Information Interchange (ASCII) file, a rich text formal (RTF) file), metadata content, executable content (e.g., a Java program) and/or so forth.

As shown in FIG. 2, the presentation composition module 260 includes a content selector 261. The content selector 261 is configured to select at least a portion of the sharer content 39 for inclusion in the presentation 37 based on presentation values (e.g., consumer values, relationship values, etc.) received at the presentation composition module 260 from the presentation value module 220. Specifically, the content selector 261 can be configured to select all of the sharer content 39 or a subset of the sharer content 39 (e.g., a subset of the sharer content 39 accessible by the consumer D) for inclusion in the presentation 37 based on one or more presentation values. Because the sharer content 39 includes various types of content, it logically follows that the portion of the sharer content 39 selected by the content selector 261 for the presentation 37 can include various types of content such as image content, audio content, textual content, metadata content, executable content, and/or so forth.

Also, as shown in FIG. 2, the presentation composition module 260 includes a presentation formatter 263 configured to define a format of the presentation 37 based on presentation values (e.g., consumer values, relationship values, etc.) received at the presentation composition module 260 from the presentation value module 220. Specifically, the presentation formatter 263 can be configured to define at least a portion of a format of the presentation 37 based on one or more presentation values.

The format of the presentation can include any portion of the visual configuration, audio configuration, non-visual or non-audio configuration, and/or so forth of elements (e.g., content, background, references) of the presentation 37. The format of the presentation 37 can include, for example, a layout of elements (e.g., content) of the presentation 37 with respect one another, the style of the presentation 37, effects associated with elements of the presentation 37 (e.g., transitions between elements of the presentation 37), and/or so forth. The format of the presentation 37 can also include temporal aspects of the presentation 37 such as, for example, the duration of the presentation 37, the synchronization of elements (e.g., audio content, visual content) of presentation 37, and/or so forth.

In some embodiments, the presentation 37 can have a static presentation format (i.e., a static presentation), a dynamic presentation format (i.e., a dynamic presentation), an interactive presentation format (i.e., an interactive presentation), and/or so forth. In some embodiments, one or more portions of the presentation 37 can be a static presentation that can be presented for consumption by the consumer D via the consumer device 240 as, for example, a static webpage, a static image, etc. In some embodiments, one or more portions of the presentation 37 can be a streamed presentation such as a video with or without an audio track (e.g., an audio portion). In some embodiments, one or more portions of the presentation 37 can be a dynamic presentation that can be defined (e.g., modified) as the presentation 37 is being consumed (e.g., viewed). In some embodiments, at least a portion of the presentation 37 can include one or more references (e.g., links, pointers) through which the consumer D (using the consumer device 240) can access different content (not shown) than the sharer content 20 included in the presentation 37, another presentation (not shown), another portion of the presentation 37, and/or so forth. Thus, one or more portions of the presentation 37 can be an interactive presentation.

In some embodiments, the presentation 37 can be, or can include, an image file, an audio file, a text file, an executable file, and/or so forth. For example, the presentation 37 can be, or can include, for example, any type of executable software module such as a computer program based on, but not limited to, micro-code or micro-instructions, machine instructions, such as produced by a compiler, code used to produce a web service, and files containing higher-level instructions that are executed by a computer using an interpreter. For example, the presentation 37 may be implemented using Java, C++, flash, hyper-text markup language (HTML) (e.g., HTML5), or other programming languages (e.g., object-oriented programming languages) and development tools.

In some embodiments, the presentation 37 can be, or can be associated with, a background process with functionality that is not visible within a display of the consumer device 240. In some embodiments, at least a portion of the presentation 37 can define at least a portion of one or more applications, or can be associated with, one or more applications installed at and/or executing at the consumer device 240.

At least a portion of the presentation 37 can have a format defined based on one or more presentation templates 40 stored in memory 270. The presentation template can be selected from the presentation templates 40 for use in the presentation 37 by the presentation formatter 263. In some embodiments, the presentation templates 40 can have a pre-defined format into which at least a portion of the sharer content 39 can be inserted as part of the presentation 37. In some embodiments, the presentation template can define (e.g., can be used to define) the content selected for inclusion and/or the format of a presentation (such as presentation 37). For example, a presentation template from the presentation templates 40 can have a field into which a particular type of sharer content (such as sharer content 39) can be inserted. In some embodiments, the presentation template can be selected for use in a presentation based on one or more presentation values from presentation value module 220. More details related to the selection and use of presentation templates are described below and in connection with, for example, FIG. 9.

Also, as shown in FIG. 2, the presentation composition module 260 includes a linking module 265 configured to include one or more references (e.g., links) to content in the presentation 37 based on one or more presentation values (e.g., consumer values, relationship values, etc.) received at the presentation composition module 260 from the presentation value module 220. Specifically, the linking module 265 can be configured to include references to content other than the sharer content 39 (e.g., third-party content, content of the consumer D, a webpage). These references can be accessed (e.g., selected, triggered) by the consumer D during consumption of the presentation 37 so that the consumer D may consume the referenced content. Thus, the consumer D can be redirected to the other content from the presentation 37. In some embodiments, the reference can be a reference to another presentation (not shown) (e.g., a presentation customized for another consumer (e.g., another consumer account), a presentation that has not yet been defined). More details related to the linking module and references within a presentation are described below and in connection with, for example FIG. 10.

The presentation composition module 260 can be configured to define at least a portion of a presentation (such as a portion of presentation 37) based on a single presentation value and/or based on a combination of presentation values (stored in for example, the presentation value database 272). For example the presentation composition module 260 can be configured define an aspect of a presentation based on a single relationship value, or based on a combination of a relationship value and a consumer value.

Figure 3:
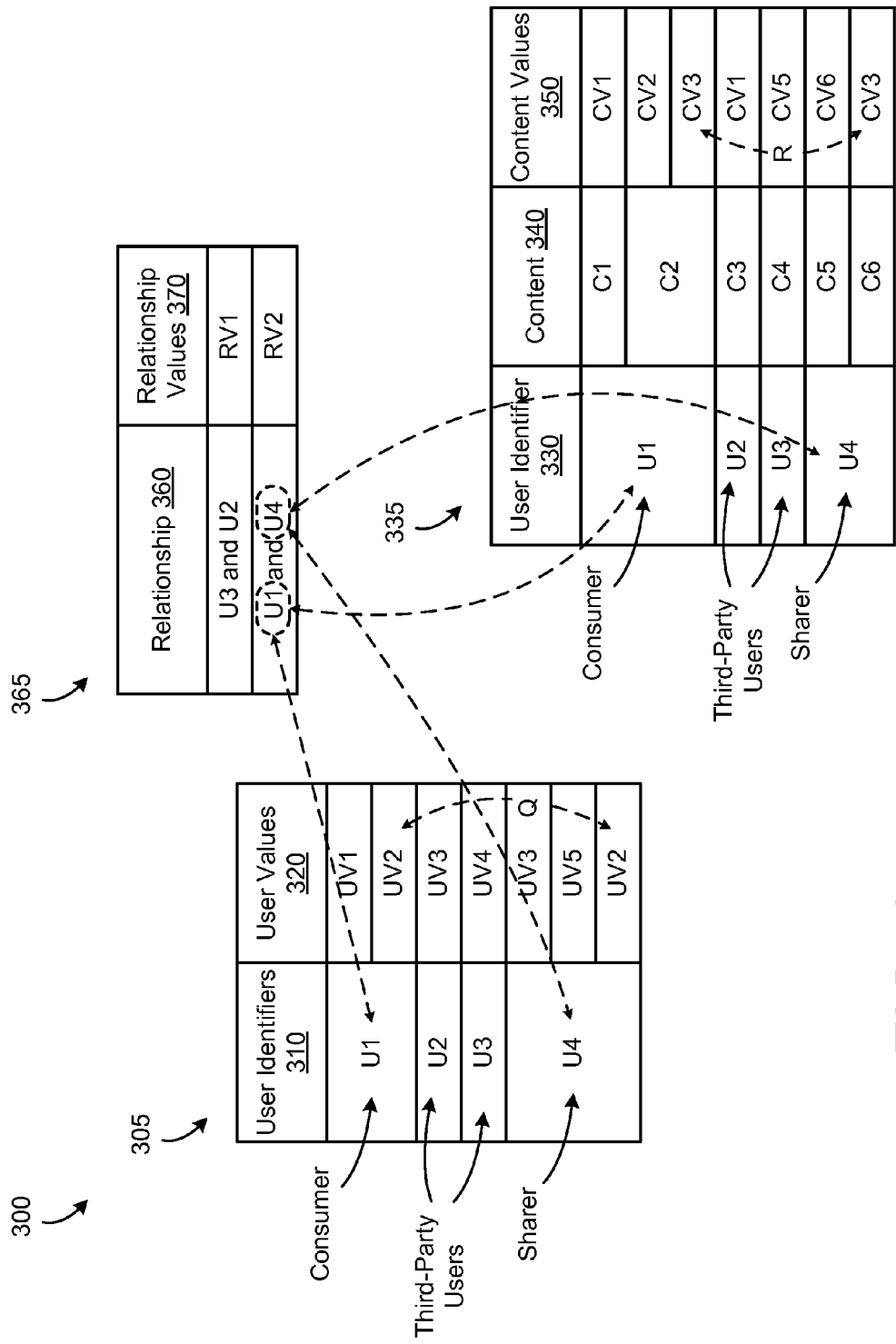
FIG. 3 is a diagram that illustrates portions of a presentation value database.

FIG. 3 is a diagram that illustrates portions of a presentation value database 300. The presentation value database 300 can be a presentation value database associated with a social media application such as presentation value database 272 shown in FIG. 2. In this embodiment, the presentation value database 300 includes a user portion 305, a content value portion 335, and a relationship portion 365.

The user portion 305 of the presentation value database 300 includes user identifiers 310 representing users of the social media application and user values 320 associated with each of the user identifier 310. For example, the user identifier U1 (shown in column 310) can represent user U1 (or a social media account of the user). In this embodiment, the user U1 is acting as a consumer (and can be referred to as consumer U1), the user U4 is acting as a sharer (and can be referred to as sharer U4), and the users U2 and U3 are acting as third-party users (and can respectively be referred to as third-party users U2 and U3).

As shown in FIG. 3, user values UV1 and UV2 are associated with consumer U1. User values UV1 and UV2 can each represent, for example, interactions of consumer U1 with a social media application. As shown in the user portion 305 of presentation value database 300, some of the users (as identified in the user identifiers 310 column) are associated with the same user values (as identified in the user values 320 column). For example, consumer U1 and sharer U4 (shown in column 310) are both associated with the same user value UV2 (shown in column 320), which is represented by dashed line Q.

The relationship portion 365 of the presentation value database 300 includes relationships 360 representing relationships between the users identified in the user portion 305 of the presentation value database 300. Also, the relationship portion 365 of the presentation value database 300 includes relationship values 370 associated with each of the relationships 360. For example, a relationship between consumer U1 and sharer U4 is shown in the relationship 360 column, and the relationship between consumer U1 and sharer U4 is associated with relationship value RV2 (shown in column 370). In some embodiments, the relationship value can represent a type of relationship between the users identified in the relationship 360 column. Although not shown in FIG. 3, in some embodiments, the relationship values (shown in column 370) associated with the relationships shown in the relationship value 360 column can be the same.

The content portion 335 of the presentation value database 300 includes content values 350 associated with content 340 of each of the users identified in the user identifier 330 column. The content 340 can be content associated with a social media account at each of the users identified in the user identifier 330 column. For example, a social media account of sharer U4 can be associated with content C5 and content C6 (shown in column 340). As shown in the content portion 335 of presentation value database 300 in this embodiment, some of the users (as identified in the user identifiers 330 column) are associated with content that has the same content values (as identified in the content values 350 column). For example, consumer U1 and sharer U4 (shown in column 330) have content associated with content value CV3 (shown in column 350), which is represented by dashed line R. Although not shown in FIG. 3, in some embodiments, the content (shown in column 340) associated with the users represented by the user identifiers 330 column can be the same.

In some embodiments, the data included in each of the portions of the presentation value database 300 can be used to associate (e.g., connect, correlate), for example, content, relationships, and/or so forth represented by presentation values when defining a customized presentation for a consumer. For example, when the consumer U1 requests access to sharer content associated with the sharer U4, the user values 320 associated with consumer U1 can be retrieved from the user portion 305 of the presentation value database 300, and can be used to define at least a portion of a presentation customized for the consumer U1 (an account of consumer U1). Also, the user portion 305 of the presentation value database 300 can be used to determine that consumer U1 and the sharer U4 have a common user value UV2 (represented by dashed line Q). This common user value can be used to define at least a portion of the presentation in a customized fashion for the consumer U1. The relationship portion of the database 365 can be used to determine that the consumer U1 and sharer U4 have a relationship represented by a relationship value RV2. This relationship value can be used to define at least a portion of the presentation customized for the consumer U1. The content portion 335 of the presentation value database 300 can be used to determine that the sharer U4 is associated with content C5 and C6, which can be used in a presentation customized for consumer U1. Also, the content portion 305 of the presentation value database 300 can be used to determine that consumer U1 and sharer U4 have a common content value CV3 (represented by dashed line R). This common content value can be used to determine that content C6 (which is associated with content value CV3) should be included in at least a portion of the presentation customized for the consumer U1.

Referring back to FIG. 2, below are examples of presentation values that can be used by the presentation composition module 260 (e.g., the content selector 261 of the presentation composition module 260, the presentation formatter 263 of the presentation composition module) to define a presentation, such as presentation 37, in response to a request from the consumer D.

For example, the presentation module 200 can be configured to receive a request for a presentation (such as presentation 37) customized for the consumer D (an account of consumer D). In response to the request, the consumer module 221 can be configured to send a consumer value to the content selector 261 so that the presentation composition module 260 can define the presentation in response to the request. The consumer value can indicate that consumer D last accessed at least a portion of the sharer content 39 via the social media application 250 at a first time. The content selector 261 can be configured to select only a portion of the sharer content 39 for inclusion in the presentation that is associated with a second time (e.g., has an upload time and/or a creation time) after the first time (as indicated within the consumer value). Accordingly, the portion of the sharer content 39 may be selected so that the presentation can be limited to the portion of the sharer content 39 that may be new to the consumer D (e.g., not already viewed by the consumer D). The presentation formatter 263 can be configured to define a duration of the presentation (or elements thereof) based on a quantity of the portion of the sharer content 39 selected for inclusion in the presentation.

Presentation composition module 260 can be configured to define at least a portion of a presentation based on a content value indicating that several portions of the sharer content 39 are associated with a particular contextual category. For example, the presentation composition module 260 can be can configured to receive a first content value indicating that sharer content 33 from the sharer content 39 is associated with a contextual category, and receive a second content value indicating that sharer content 31 from the sharer content 39 is also associated with the same contextual category. The content selector 261 of the presentation composition module 260 can be configured to select sharer content 33 and sharer content 31 for inclusion in a presentation based on both of these portions of the sharer content 39 being associated with the same contextual category. Accordingly, the presentation formatter 263 can be configured to define a presentation associated with the contextual category. In some embodiments, the presentation formatter 263 can be configured to include sharer content 31 and 33 in a presentation template from the presentation templates 40 that is associated with the contextual category (based on the content values). In some embodiments, the linking module 262 can be configured to include one or more references in the presentation to content other than the sharer content 39 (e.g., content associated with a third-party user, a webpage) that is associated with the contextual category (based on the content values).

Presentation composition module 260 can be configured to define a presentation (such as presentation 37) based on a combination of a content value and a relationship value. For example, the presentation composition module 260 can receive a content value from the content module 224 that indicates that a portion of the sharer content 39 is associated with a family event (e.g., a wedding, a vacation). The presentation composition module 260 can also receive a relationship value from the relationship module 222 indicating that the consumer D is a family member of the sharer C. Accordingly, the presentation composition module 260 can be configured to define a presentation that includes the portion of the sharer content 39 based on a determination that the consumer D, who is related to the sharer C, may be interested in the portion of the sharer content 39 based on the relationship represented by the relationship value. The nexus between the relationship value and the context value can be defined within (or determined using) a presentation value database that can be accessed by the composition module 260 to make the determination. Specifically, the content selector 261 can be configured to select a portion of the sharer content 39 and/or the presentation formatter 263 can be configured to define a format of the presentation based on the selected portion of the sharer content 39 in response to the nexus between the content value and the relationship value.

In some embodiments, the linking module 265 can be configured to include one or more references in the presentation based on the combination of the content value and the relationship value. For example, the linking module 265 can be configured to include a reference to content having the same content value when the content was shared by a user having a relationship with the consumer D that is the same as the relationship between the consumer D and the sharer C as represented by the relationship value.

If the presentation composition module 260 receives a relationship value from the relationship module 222 indicating that the consumer D has non-family relationship with the sharer C (such as, for example, a business relationship with the sharer C), the presentation composition module 260 can be configured to define a presentation that includes a portion of the sharer content 39 that is identified based on a content value as being less personal (e.g., not in a contextual category related to a family event, a business-related contextual category). Thus, the presentation can be defined by the presentation composition module 260 based on the lack of a nexus between the relationship value and the content value (as defined within a presentation value database that can be accessed by the composition module 260).

The presentation composition module 260 can be configured to define a presentation (such as presentation 37) based on a consumer value indicating the frequency that a consumer accesses (e.g., logs onto) the social media application 250. For example, a consumer value can indicate that the consumer D occasionally accesses the social media application 250 (e.g., accesses the social media application 250, on average, once a month or once a week). The content selector 261 can be configured to define a presentation that includes a portion of the sharer content 39 related to significant events of the sharer C over the last month based on this consumer value. The significant events of the sharer C can be determined based on one or more content values identifying portion of the sharer content 39 as significant events. If the consumer value had indicated that the consumer D accesses the social media application 250 with a frequency that satisfies a threshold condition (e.g., accesses the social media application 250 a threshold number of times), the content selector 261 can be configured to define a presentation that includes a portion of the sharer content 39 related to all of the events of the sharer C.

In some embodiments, the presentation composition module 260 can be configured to define a presentation based on a consumer value indicating prior consuming behavior of the consumer such as consumer D. The presentation formatter 263 can be configured to define a duration of a presentation based on a consumer value indicating that a consumer, on average, closes a presentation after viewing the presentation for less than a time period even if the duration of the presentation is longer than the time period. Accordingly, the presentation formatter 263 can be configured to define a presentation for the consumer D that has a duration that is less than or equal to 30 seconds. Similarly, the presentation composition module 260 can be configured to define presentation based on a sharer value indicating prior consuming behavior of a sharer. The presentation formatter 263 can be configured to define a duration of the presentation 37 based on a sharer value indicating that the sharer C, on average, consumes presentations longer than 20 seconds.

The presentation composition module 260 can be configured to define a presentation based on interactions of a consumer with references included in a presentation as represented by one more consumer values. For example, in some embodiments, linking module 265 of the presentation composition module 260 can be configured to include multiple references within the presentation 37 in response to a consumer value indicating that the consumer D frequently accesses references included within other presentations. The references can be references to content of a particular type (e.g., video content) and/or a particular subject matter (e.g., related to a particular topic) in accordance with a consumer value indicating that the consumer D may only (or often) access references to content of a type and/or subject matter.

The presentation composition module 260 can be configured to define a presentation based on consumer value indicating that the consumer D prefers to consume specified content (or presentations). The content could be at least a portion of the sharer content 39 (within a presentation) or other content (e.g., webpage). The preference for the content (or presentations) can be determined based on, for example, feedback produced using the social media application 250. For example, the presentation composition module 260 can be configured to receive a consumer value indicating that the consumer D prefers (or frequently consumes) a type of content. The content module 224 can be configured to determine that the type of content is associated with a specified contextual category, and can be configured to define a content value representing the specified contextual category. The content selector 261 can be configured to select a portion of the sharer content 39 for inclusion in a presentation (such as presentation 37) when the portion of the sharer content 39 that is related to the specified contextual category based on a content value associated with the portion of the sharer content 39.

In some embodiments, the presentation formatter 263 can be configured to define a format of the presentation based on the type of content preferred by the consumer D being associated with the same or similar presentation format. In some embodiments, the linking module 265 can be configured to include references in a presentation to content that is similar to the type of content that is preferred by the consumer D. In some embodiments, the presentation composition module 260 can be configured to define a presentation based on one or more sharer values indicating that the sharer C prefers to consume specified content (or presentations).

The presentation composition module 260 can be configured to define a presentation (such as presentation 37) based on one or more third-party values. For example, a third-party value indicating that many third-party users have been accessing and/or sharing (e.g., posting) content associated with a specified topic, represented by a content value, can be received at the presentation composition module 260 from the presentation value module 220. The content selector 261 of the presentation composition module 260 can be configured to select a portion of the sharer content 39 for inclusion in a presentation (such as presentation 37) based on a combination of the third-party value and content value. In some embodiments, the third-party value can be defined based on results from, for example, a search engine that are associated with a general population that may not include the sharer C and/or the consumer D. For example, the third-party value can be an indicator of a number of hits for a particular term using a search engine and/or a website page rank.

The presentation composition module 260 can be configured to define a presentation based on content shared by the consumer D when acting as a sharer. For example, the consumer D may post content via the social media application 250 to a social media account of the consumer D. The content posted by the consumer D can be analyzed by the content module 224 to determine that the posted content is associated with a particular contextual category, and can be configured to define a content value representing the particular contextual category. Accordingly, the presentation composition module 260 can be configured to define a presentation that includes a portion of the sharer content 39 that has a content value that is the same as or similar to the content value associated with the content posted by the consumer D.

In some embodiments, the content posted by the consumer can be analyzed by the presentation formatter 263 to determine a format associated with the content posted by the consumer D. The presentation formatter 263, when defining a presentation, can use a format that is similar to the format associated with the content posted by the consumer D.

In some embodiments, the content posted by the consumer D can be analyzed by the linking module 265 to determine whether or not references are associated with the content posted by the consumer D. The linking module 265 can be configured to include references in one or more presentations customized for the consumer D that include references that are similar to the references associated with the content posted by the consumer D.

In some embodiments, the presentation composition module 260 can be configured to define a presentation based on a presentation value indicating prior consuming or sharing behavior of a sharer (such as sharer C). The presentation formatter 263 can be configured to define a format of the presentation 37 customized for the consumer D based on a sharer value indicating that the sharer C prefers to access presentations having the same format.

In some embodiments, the presentation composition module 260 can be configured to define a presentation that is different than a previously defined presentation. For example, if a first subset of the sharer content 39 has already been included in a first customized presentation for the consumer D in response to a first request for a presentation triggered by the consumer D, the content selector 261 can be configured to include a second subset of the sharer content 39 in a second customize presentation for the consumer D (or another consumer) in response to a second request for a presentation triggered by the consumer D (or another consumer). In some embodiments, the second subset of the sharer content 39 can be defined as a different or mutually exclusive subset from the first subset of the sharer content 39. In some embodiments, the presentation formatter 263 of the presentation composition module 260 can be configured to define a customized presentation for the consumer D (or another consumer) with a format that is different than a format of a previously customize presentation for the consumer D (or another consumer). In some embodiments, the linking module 265 of the presentation composition module turns 60 can be configured to exclude one or more references from future presentations if the reference(s) were not accessed (e.g., were ignored) in previous presentations.

In some embodiments, the presentation composition module 260 can be configured to define a presentation based on a quality (e.g., a resolution, a signal integrity, etc.) of the content. For example, the content selector 261 can be configured to select a first portion of the sharer content 39 rather than a second portion of the sharer content 39 based on a content value indicating that the first portion of the sharer content 39 has a lower quality than the second portion of the sharer content 39.

As shown in FIG. 2, the presentation module 200 includes a conflict resolution module 207. The conflict resolution module 207 is configured to resolve conflicts between presentation values based on, for example, a rules-based algorithm, priority values associated with each of the presentation values, and/or so forth. Conflicts can include, for example, selection of a first subset of sharer content based on a first presentation value and selection of a second subset of sharer content different from the first subset of sharer content based on the second presentation value. In some embodiments, the selection of the first subset of sharer content can be mutually exclusive with the selection of the second subset of sharer content. Accordingly, a conflict related to the selection of a subset of the sharer content can arise based on the first presentation value and the second presentation value.

For example, the conflict resolution module 207 of the presentation composition module 260 can be configured to resolve a conflict between a content value and a relationship value using a rules-based algorithm. Thus, the conflict resolution module 207 can be configured to trigger the presentation composition module 260 to define a presentation based on the content value or the relationship value using a rules-based algorithm. In some embodiments, conflicts between presentation values can be resolved by the conflict resolution module 207 based on, for example, a priority value associated with each of the content values. For example, conflict resolution module 207 can be configured to trigger the presentation composition module 260 to define a presentation based on consumer values having priority (as represented by a priority value) over sharer values and relationship values (which may be associated with lower priorities as represented by priority values), and sharer values having priority (as represented by a priority value) over content values (which may be associated with a lower priority as represented by a priority value).

As shown in FIG. 2, the presentation module 200 includes a notification module 205. In some embodiments, the notification module 205 can be configured to send an indicator to the consumer D via the consumer device 240 that a presentation has been customized for consumption by the consumer D (via an account of consumer D). In some embodiments, the indicator can be presented to the user via the social media user interface 15. In some embodiments, the notification module 205 can be configured to provide an option to consume or ignore the customized presentation. In some embodiments, the notification module 205 can be configured to send an indicator (e.g., send an indicator via the social media user interface 15) to the sharer C via the sharer device 210 that a presentation has been customized for consumption by the consumer D via the consumer device 240.

In some embodiments, the notification module 205 can be configured to prompt the sharer C to share content for inclusion in one or more presentations based on one or more presentation values. For example, the notification module 205 can be configured to prompt the sharer C to share content associated with a particular contextual category based on one or more preferences for that particular contextual category represented within consumer values associated with one or more consumers (such as consumer D).

As shown in FIG. 2, the sharer database 274 is configured to store preferences 50. These preferences 50 can be preferences of the sharer C that can be used to define at least a portion of a presentation such as presentation 37. For example the preferences 50 can indicate that certain presentation value should be used (or certain presentation values should not be used) to define the presentation 37. In some embodiments, the preferences 50 can indicate that the presentation 37 should be defined with (or cannot be defined with) specific portions of the sharer content 39 and/or that the presentation 37 should be defined with (or cannot be defined with) a specified format (e.g., specified duration, a specified presentation template, etc.).

Although not shown in FIG. 2, in some embodiments, preferences of the consumer D can be used to define a presentation for the consumer D. The preferences of the consumer D can be similar to the preferences of the sharer described in connection with preferences 50.

In some embodiments, one or more portions of the components shown in the social media application 250 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the presentation module 200 can be, or can include, a software module configured for execution by at least one processor (not shown). In some embodiments, the functionality of the components can be included in different modules and/or components than those shown in FIG. 2. For example, although not shown, the functionality of the presentation value module 220 can be included in a different module than the presentation value module 220, or divided into several different modules.

The presentation value database 272 and/or sharer database 274 shown in FIG. 2 can be repositories within which data associated with users (such as sharer C) is stored. In some embodiments, the presentation value database 272 and/or the sharer database 274 can be divided into more than one database or consolidated with other databases (e.g., a general database) of the social media application 250.

Although not shown, in some embodiments, the memory 270 can be implemented as more than one memory component (e.g., more than one random-access memory (RAM) component or disk drive memory) associated with the social media application 250. In some embodiments, the memory 270 can be a database memory. In some embodiments, the memory 270 can be, or can include, a non-local memory. For example, the memory 270 can be, or can include, a memory shared by multiple devices (not shown). In some embodiments, the memory 270 can be associated with a server device (not shown) within a network and configured to serve the social media application 250.

Although not shown in FIG. 2, in some embodiments, the presentation module 200 can be configured to include content other than sharer content 39 in one or more presentations customized for one or more consumers (one or more consumer accounts). For example, the presentation module 200 can be configured to include third-party content, consumer content, content from social media accounts of a multiple sharers (that may be related as indicated by relationship values), etc. in the presentation 37 customized for the consumer D based on one or more presentation values.

Figure 4:
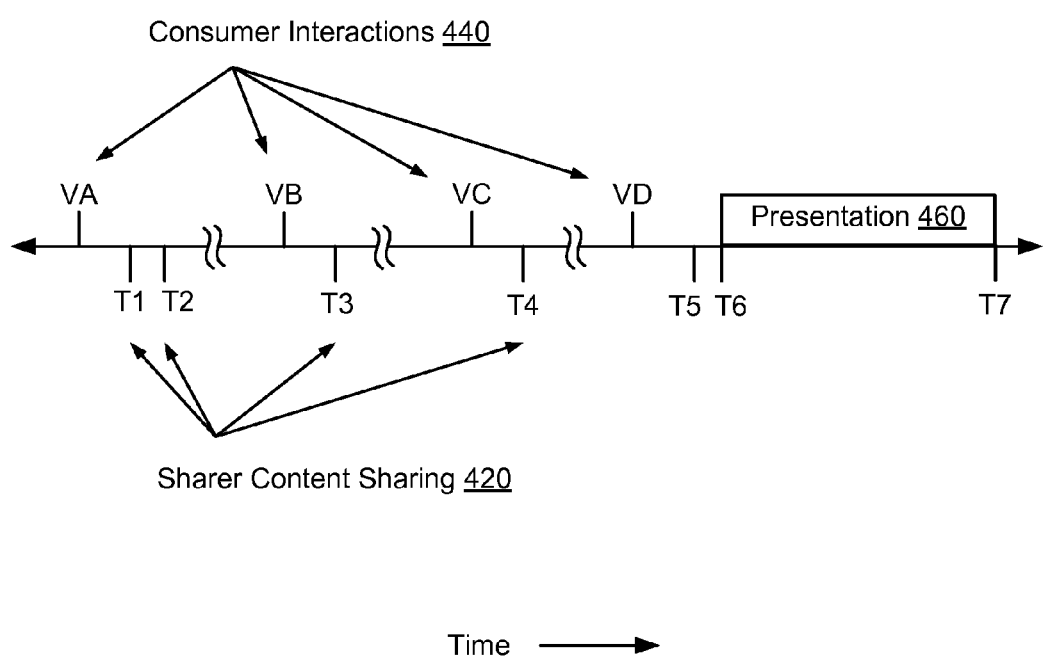
FIG. 4 is a diagram that illustrates a timeline of consumer interactions, sharer content sharing, and execution of a presentation.

FIG. 4 is a diagram that illustrates a timeline of consumer interactions 440, sharer content sharing 420, and execution of a presentation 460. The timeline illustrates that sharer content is shared (e.g., posted, uploaded) by a sharer using a social media application at times T1, T2, T3, and T4. The timeline also illustrates consumer interactions at times VA, VB, VC, and VD with (e.g., using) the social media application. At least a portion of presentation 460 is defined in response to a request for access to sharer content triggered by a consumer and received at time T5. The presentation 460 is sent to a consumer device through which the consumer may consume the presentation 460 during a time period between times T6 and T7. In some embodiments, the presentation 460 can be defined by a presentation module such as presentation module 200 shown in FIG. 2.

The presentation 460 can be defined by a presentation module based on consumer values representing the consumer interactions 440 with the social media application. The consumer values representing the consumer interactions at times VA, VB, VC, and VD can be respectively referred to as consumer values VA, VB, VC, and VD. The consumer values can be defined by, for example, a consumer module of a presentation value module such as consumer module 221 of presentation value module 220 shown in FIG. 2.

In this embodiment, the consumer interactions at times VA and VD each represent times at which a consumer has accessed the social media application (e.g., accessed by logging into the social media application) to consume content associated with social media accounts of users other than the sharer. The consumer interaction at time VB represents a time at which the consumer has accessed sharer content associated with a social media account of the sharer using the social media application. The consumer value VB can indicate that the consumer accessed sharer content at time VB. Finally, the consumer interaction at time VC represents a time that content is shared by the consumer (when acting as a sharer) to a social media account of the consumer. The consumer value VC can indicate the type of content shared by the consumer at time VC.

The presentation 460 can be defined by the presentation module to include only the sharer content shared by the sharer at times T3 and T4. The sharer content included in the presentation 460 can be limited to the sharer content shared at times T3 and T4 because the consumer last accessed content of the sharer at time VB (after time T2) as indicated by consumer value VB. The presentation 460 can also be defined by the presentation module to include sharer content that may be related to the content consumed by the consumer at times VA and VD, as well as the content shared by the consumer at time VC, as indicated by consumer values corresponding with their consumer interactions at these times.

As shown in FIG. 4, the presentation 460 is defined by multiple consumer values associated with consumer interactions with the social media application prior to receipt of a request to access the sharer content. In some embodiments, the consumer values associated with the consumer actions 440 can be defined and stored in a presentation value database (such as presentation value database 272 shown in FIG. 2) where they can be efficiently accessed in response to a request for sharer content being received. Although not shown in FIG. 4, in some embodiments the presentation 460 could be defined based on interactions of a third-party user with the social media application.

In some embodiments, only a portion of available consumer values may be considered for use in defining a presentation such as presentation 460. For example, only consumer values associated with consumer interactions occurring within a time frame may be considered for use in defining a presentation such as presentation 460. In some embodiments, only a certain number of consumer values may be considered for use in defining a presentation. In some embodiments, only consumer values of a particular type may be considered by presentation module.

Figure 5:
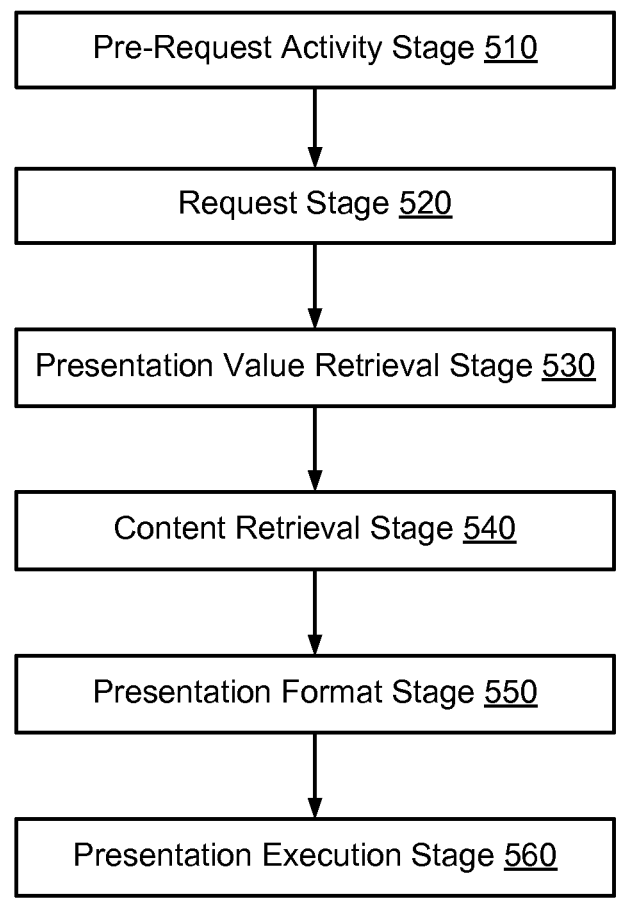
FIG. 5 is a diagram that illustrates stages related to defining a customized presentation for a consumer based on sharer content.

FIG. 5 is a diagram that illustrates stages related to defining a customized presentation for a consumer based on sharer content. The customized presentation can be defined by a presentation module of a social media application. As shown in FIG. 5, the stages include a pre-request activity stage 510, a request stage 520, a presentation value retrieval stage 530, a content retrieval stage 540, a presentation composition stage 550, and a presentation execution stage 560.

During the pre-request activity stage 510, one or more presentation values can be defined. For example, consumer values representing interactions of a consumer with a social media application can be defined, content values associated with content shared by a sharer, third-party values representing interactions of a third-party with the social media application, and/or so forth can be defined during the pre-request activity stage 510. In some embodiments, for example, one or more relationship values representing the relationship between the sharer and the consumer can be defined and stored in a database (e.g., a presentation value database) where they can be retrieved.

During the request stage 520, a request for a presentation can be defined and received in response to a consumer requesting access to sharer content via the social media application. In some embodiments, multiple requests can be defined and/or received in parallel. In some embodiments, the consumer can specifically request, via a user interface associated with the social media application, that a presentation customized for the consumer (an account of the consumer) be defined by the presentation module. In some embodiments, a notification module, such as notification module 205 shown in FIG. 2, can be configured to notify a sharer that a request for a customized presentation for the consumer has been received.

During the presentation value retrieval stage 530 one or more presentation values that can be used to define a presentation can be retrieved from, for example, a presentation value database (such as presentation value database 272 shown in FIG. 2). In some embodiments, the presentation values can be retrieved by presentation value module such as presentation value module 220 shown in FIG. 2. In some embodiments, only presentation values associated directly with the consumer such as consumer values and relationship values can be retrieved and used to define a presentation. In some embodiments, only presentation values that are allowed, based on a preference of a sharer, for use in defining a presentation may be retrieved. In some embodiments, during the presentation value retrieval stage 530, one or more presentation values can be defined. In some embodiments, during the presentation value retrieval stage 530, conflicts between presentation values can be resolved a conflict resolution module such as conflict resolution module 207 shown in FIG. 2.

During the content retrieval stage 540, one or more presentation values can be used to select sharer content (or other content) for inclusion in a presentation customized for the consumer. In some embodiments, the sharer content can be selected by a content selector such as content selector 261 shown in FIG. 2.

During the presentation format stage 550, one or more presentation values can be used to define a customized format of the presentation for the consumer. The format of the presentation can be defined based on the sharer content that is selected. In some embodiments, at least a portion of the content retrieval stage 540 and at least a portion of the presentation format stage 550 can be performed at the same time.

During the presentation execution stage 560, at least a portion of the presentation is sent for consumption by the consumer using, for example, a consumer device. In some embodiments, one or more functions associated with the stages shown in FIG. 5 can be performed iteratively. For example, a first portion of the presentation can be defined during the content retrieval stage 540 and during the presentation format stage 550 by a presentation module based on a first set of presentation values. While the first portion of the presentation is sent for consumption by the consumer during the presentation execution stage 560, a second portion of the presentation can be defined during the during the content retrieval stage 540 and during the presentation format stage 550 by the presentation module based on a second set of presentation values.

In some embodiments, the stages (or a portion thereof) can be performed in a different order than that shown in FIG. 5. For example, one or more presentation values may be retrieved during another presentation value retrieval stage (not shown) between the content retrieval stage 540 and the presentation format stage 550.

Figure 6A:
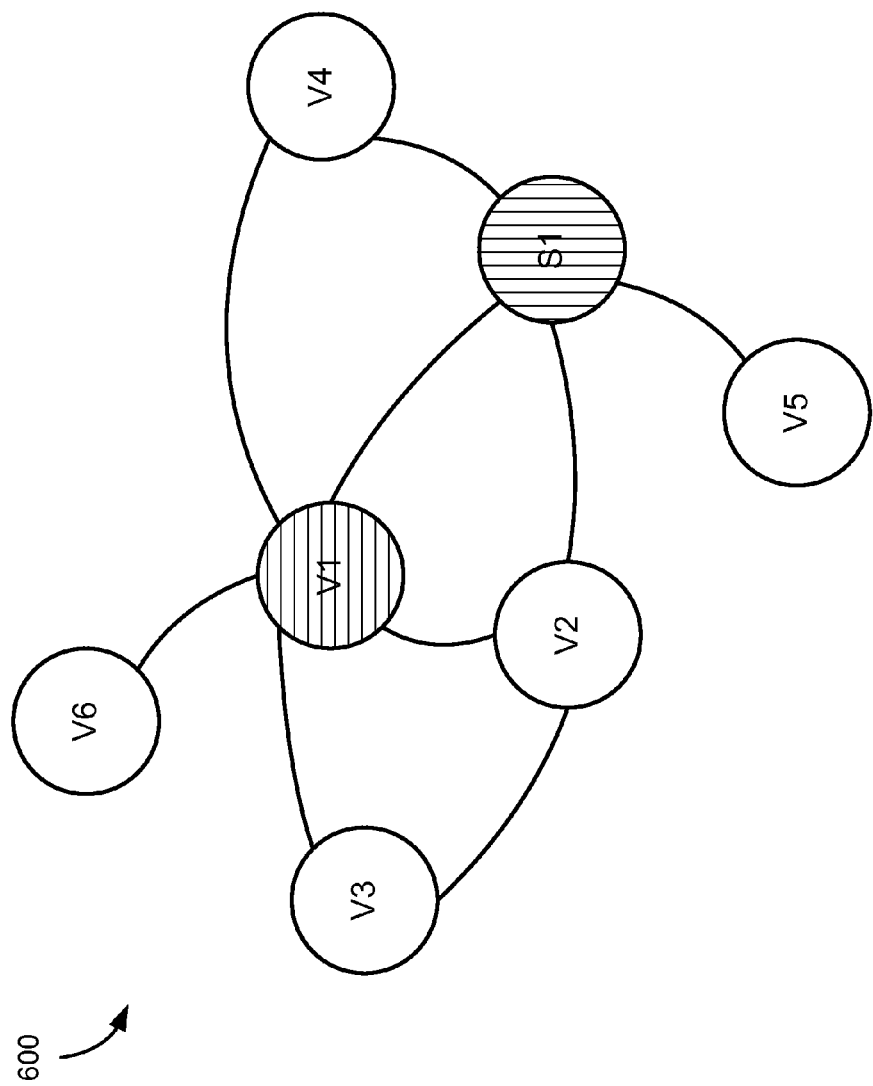
FIG. 6A is a diagram that illustrates a social network including multiple users.

FIG. 6A is a diagram that illustrates a social network 600 including multiple users. The social network 600 includes several users (or user identifiers of user accounts) represented by circles. Specifically, the social network includes users V1 through V6. For purposes of this example, user V1 is acting as a consumer that has requested access to content of user S1, acting as a sharer, and will be referred to as consumer V1. The user S1 will be referred to as sharer S1. In this embodiment, the consumer V1 is highlighted with horizontal lines and the sharer S1 is highlighted with vertical lines. Relationships between the users are represented by lines between the circles. The social network 600 shown in FIG. 6A is targeted to (e.g., originates with sharer S1) and can be a portion of a larger social network (not shown).

As shown in FIG. 6A, the sharer S1 and the consumer V1 both have relationships with several of the other users. For example, the sharer S1 has a relationship with user V2 and a relationship with user V4. Consumer V1 also has a relationship with user V2 and a relationship with user V4. As shown in FIG. 6A, the sharer S1 has relationships with users that the consumer V1 does not also have a relationship. Specifically, the sharer S1 has a relationship with user V5 and the consumer V1 does not also have a relationship with user V5.

In some embodiments, the relationships can be defined between the users based on a user accepting a relationship with another user (using a social media application). For example, when sharer S1 authorizes user V4 (using a social media application) to access content associated with sharer S1, a relationship between sharer S1 and user V4 can be defined and the relationship between the sharer S1 and the user V4 can be included in the social network 600.

FIG. 6B is a diagram that illustrates a database 605 with information associated with the relationships within the social network 600 shown in FIG. 6A. The database 605 can be, or can be included within, a presentation value database. As shown in FIG. 6B, the database 605 includes user identifiers 610 representing at least some of the users that are shown in FIG. 6A. For example, a user identifier associated with sharer S1 and consumer V1 are shown in the user identifiers 610 column. The user identifiers 610 can represent user identifiers of a user account of a social media application.

The database 605 also includes relationship values 630 representing characteristics of a relationship between the users identified by the user identifier 610 and users identified by the relationship target identifiers 620. The relationship characteristics that are represented within the database 605 are relationship strength values 632 and relationship type values 634. The relationship strength values 632 can represent a relative quantity of common relationships between the users identified within the user identifiers 610 column and the users identified within the relationship target identifiers 620 column. The relationship strength values shown in the relationship strength value 632 column are either "Tier0", "Tier1", "Tier2", or no value (represented by a line). The relationship type values 634 can represent a type of relationship between the users identified within the user identifiers 610 column and the users identified within the relationship target identifiers 620 column. The relationship type values shown in the relationship type values 634 column are either "Family", "Acquaintance", "Business", or no value (represented by a line). Although not shown in FIG. 6B, in some implementations, additional types of relationships such as a friend relationship can be included.

For example, as shown in FIG. 6B, the sharer S1 has a relationship with the consumer V1 that has a "Tier2" relationship strength value (shown in column 632) and has a "Family" relationship type value (shown in column 634). The relationship between the sharer S1 and the consumer V1 can be characterized as a "Tier2" relationship because the sharer S1 and the consumer V1 also have relationships with two common users—user V2 and user V4. Specifically, sharer S1 has a relationship with user V4 and consumer V1 also has a relationship with user V4. Also, sharer S1 has a relationship with user V2 and consumer V1 also has a relationship with user V2. This is contrasted with the "Tier1" relationship between sharer S1 and user V2, which is characterized as such because sharer S1 and user V2 have a relationship that is common with one user—consumer V1.

In this embodiment, the relationship type value can be defined by the consumer V1 and/or the sharer S1 when a relationship is defined between the consumer V1 and the sharer S1. Thus, the consumer V1 can be identified (using a social media application) by the sharer S1 as having a family relationship with the sharer S1. In some embodiments, a relationship type value can be determined based on analysis of interactions between the consumer V1 and the sharer S1.

As shown in FIG. 6A, user V3 and sharer S1 do not have direct relationship. Because there is no relationship between the sharer S1 identified within the user identifiers 610 column and user V3 identified within the relationship target identifiers 620 column, the database 605 shown in FIG. 6B does not illustrate a relationship strength value or a relationship type value in the row associated with user V3.

The relationship values 630 shown in FIG. 6B can be used by, for example, a presentation module to define one or more presentations customized for a consumer (an account of the consumer). For example, a content selector (such as content selector 261 shown in FIG. 2) can be configured to select a subset of sharer content associated with sharer S1 for inclusion in a presentation for consumer V1 based on the "Family" relationship type value shown in column 634. The content selector can be configured to select a different subset of sharer content associated with sharer S1 for inclusion in a presentation for user V2 based on the "Acquaintance" relationship type value shown in column 634.

In some embodiments, relationships that are not directly connected with sharer S1 can be used to define a customized presentation for the consumer V1. For example, interactions between consumer V1 and user V3 can inform customization of the presentation for the consumer V1. Accordingly, the relationship between consumer V1 and user V3, and presentation values that can be associated with the relationship between consumer V1 and user V3 can be used to customize a presentation for consumer V1.

In some embodiments, relationships that are not directly connected with sharer S1 (or the target of a social network), can be referred to as attenuated relationships. Relationships that are directly connected with sharer S1 can be referred to as first-degree relationships. For example, the relationship between sharer S1 and consumers V1, V2, V4, and V5 can be referred to as a first-degree relationship. Relationships between S1 and users that are not directly connected to S1 but that are directly connected to users that have a first-degree relationship with sharer S1 can be referred to as second-degree relationships. For example, the relationship between S1 and user V3 can be referred to as a second-degree relationship because consumer V1 is directly related to sharer S1, and consumer V3 is directly related to consumer V1, but consumer V3 is not directly connected to sharer S1. In some embodiments, presentation values associated with higher degree relationships (e.g., third-degree relationships) can be used to define a presentation for a consumer.

In some embodiments, information about the relationships within the social network 600 can be defined as changes to the social network occur. For example, when a new relationship is defined between one user and the sharer S1, information about the new relationship can be define and represented within the database (by a relationship module).

Figure 7:
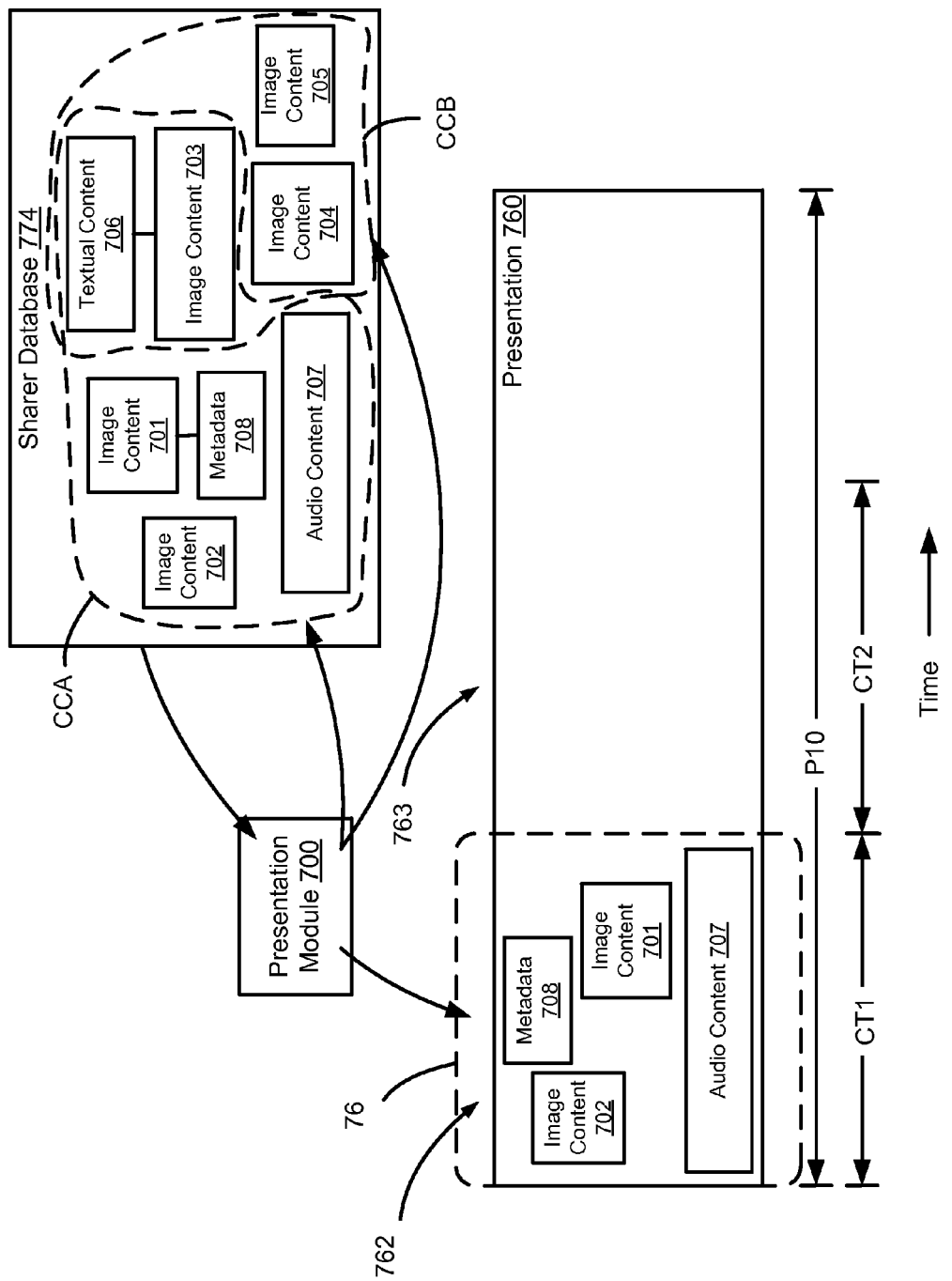
FIG. 7 is a diagram that illustrates defining of a portion of a presentation within a composition time window based on sharer content stored in a sharer database.

FIG. 7 is a diagram that illustrates defining of a portion 762 of a presentation 760 within a composition time window 76 based on sharer content stored in a sharer database 774. The entire presentation 760, including the portion 762 of the presentation 760, is defined by a presentation module 700. As shown in FIG. 7, time is increasing to the right, and the presentation 760 is a presentation that can be streamed (e.g., streamed as a video) to a consumer device.

As shown in FIG. 7, the sharer content included in the shared database 774 is included in two different contextual categories—contextual category CCA and contextual category CCB. Image content 701 through 703, textual content 706, audio content 707, and metadata content 708 are included in contextual category CCA, and image content 703 through 705 and textual content 706 are included in contextual category CCB. In some embodiments, the contextual categories, which can be represented by content values, can represent a vacation category, a scenery category, a family event category (e.g., a wedding event category), a business category, an animal category, and/or so forth.

As shown in FIG. 7, image content 703 and textual content 706 are included in both the contextual categories. In some embodiments, contextual categories can be mutually exclusive. Thus, sharer content included in a first contextual category may not be included in a second contextual category because the second contextual category is exclusive of the first contextual category.

In this embodiment, the sharer content is divided into the two different categories by the presentation module 700. Specifically, the sharer content can be divided into the contextual categories by a content module (not shown) of the presentation module 700. In some embodiments, the presentation module 700 can be configured to determine that a portion (e.g., image content 701 through 703) of the sharer content is to be included in a contextual category (e.g., contextual category CCA) based on an analysis of the subject matter of the portion of the sharer content and/or based on metadata associated with the portion of the sharer content.

As shown in FIG. 7, image content 701 is associated with metadata 708. The metadata 708 can describe an aspect of the image content 701. For example, the metadata 708 can indicate that the image content 701 was uploaded from and/or created at a geo-location, uploaded at a time, is related to other sharer content, and/or so forth. In some embodiments, the presentation module 700 can be configured to associate image content 701 to contextual category CCA based on the metadata 708 associated with image content 701. Similarly, image content 703 is associated with textual content 706 that can describe an aspect of the image content 703.

In some embodiments, one or more portions of the sharer content can be included in a contextual category as specified by the sharer of the sharer content. For example, a sharer can associate image content (e.g., image content 71) as being part of a contextual category. In some embodiments, the sharer can identify the image content as being part of the contextual category when the image content is being shared (e.g., uploaded) via a social media application.

In this embodiment, the composition time window 76 is a sliding composition time window that indicates the portion of the presentation 760 that is being defined. The presentation 760 is defined using a sliding composition time window (such as composition time window 76) so that portions of the presentation 760 can be dynamically defined as other portions of the presentation (previously defined) are being consumed by a consumer. Accordingly, portions of the presentation 760 can be sent to a consumer for consumption before the entire presentation 760 has been defined to reduce delay (e.g., minimize delay) between a request for the presentation 760 and actual sending of the presentation 760 for consumption.

As shown in FIG. 7, the presentation module 700 is configured to define the portion 762 of the presentation 760 that is included within the composition time window 76 that has a fixed duration CT1. The composition time window 76 is used to illustrate the portion of the presentation 760 that is being defined by the presentation module 700. After the portion 762 of the presentation 760 has been defined by the presentation module 700, the portion 762 of the presentation 760 can be sent to a consumer for consumption. The presentation module 700 can be configured to define a portion 763 of the presentation 760 having a duration CT2 corresponding to the fixed duration CT1 of the composition time window 76 while the portion 762 of the presentation 760 is being consumed by the consumer. Although not shown in FIG. 7, the composition time window 76 can be associated with the portion 763 of the presentation 760 as portion 763 the presentation 760 is being defined.

In some embodiments, portions of the presentation 760 can be defined until the presentation 760 is closed (or until content that can be included in the presentation 760 is exhausted). In some embodiments, the presentation 760 can be dynamically defined based on interactions of a consumer with the presentation 760. For example, after the portion 762 of the presentation 760 has been defined by the presentation module 700 and is being consumed by a consumer, an interaction of the consumer with the portion 762 of the presentation 760 can be detected. The portion 763 of the presentation 760 can be defined (or modified) based on the interaction of the consumer with the portion 762 of the presentation 760. Thus, the portion 763 of the presentation 760 can be customized for the consumer based on the interaction of the consumer with the portion 762 of the presentation 760. Specifically, if a consumer interacts with image content 702 included in the portion 762, the portion 763 can be defined with a portion of the sharer content included in sharer database 774 that is similar to image content 702 (such as image content 703 which is included in the same contextual category CCA as image content 702). Additional details related to interactively and/or dynamically defining a presentation are described in connection with, for example, FIGS. 10 and 11.

As shown in FIG. 7, the portion 762 of the presentation 760 that has been defined includes sharer content exclusively from contextual category CCA. The sharer content can be exclusively selected from contextual category CCA for inclusion in the portion 762 of the presentation 760 based on one or more presentation values (e.g., consumer values, relationship values). In some embodiments, a duration P10 of the presentation 760 can be defined based on one or more presentation values.

As shown in FIG. 7, the portion 762 of the presentation 760 includes both visual content as well as audio content. In some embodiments, the format of visual content and the format of the audio content can be defined based on one more presentation values. For example, image content 701 and image content 702 can be selected for inclusion in the presentation 760 (rather than image content 703) based on a consumer value indicating that the consumer of the presentation 760 has previously accessed image content similar to image content 701 and image content 702. In some embodiments, the inclusion of image content 702 before image content 71 can be determined based on a consumer value associated with the consumer of the presentation 760. Also, the audio content 707 can be included in the presentation 760 based on a consumer value indicating that the consumer of the presentation 760 often listens to audio content similar to audio content 707. In this embodiments, metadata content 708, which is typically not visible (in contrast to the textual content 706), is converted into visual metadata content that can be viewed within the presentation 760 by the presentation module 700.

Figure 8:
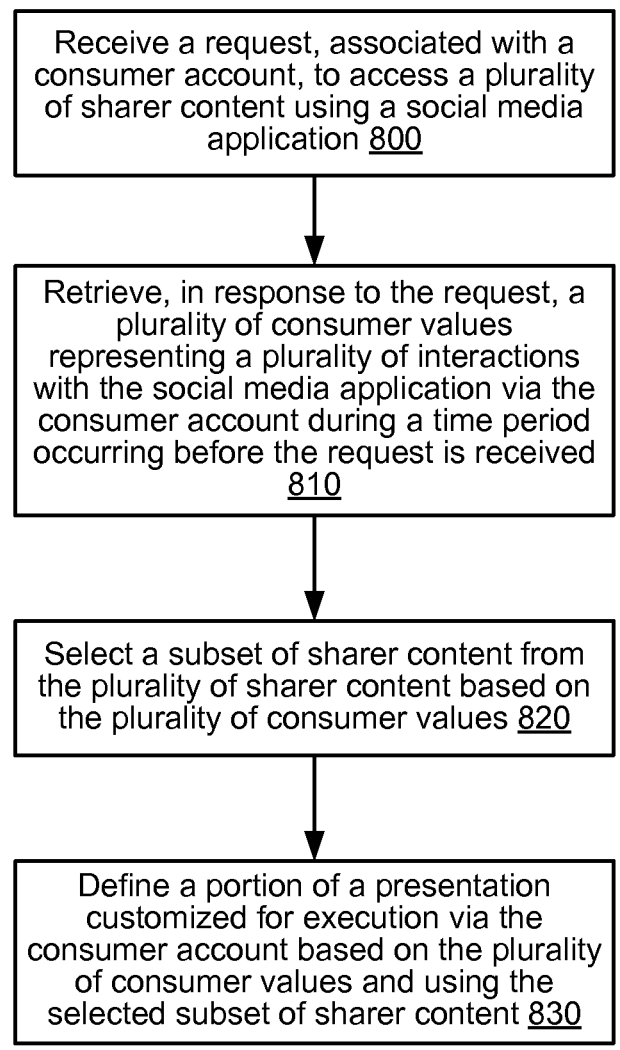
FIG. 8 is a flowchart that illustrates a method for defining presentation.

FIG. 8 is a flowchart that illustrates a method for defining presentation. As shown in FIG. 8, a request, associated with a consumer, to access a plurality of sharer content using a social media application is received. (block 800) The sharer content can be associated with a sharer account (via a sharer device) using the social media application. The social media application can be any type of application configured to facilitate users of the social media platform to interact with and/or share content. The social media application can be associated with a platform that can be, or can include, any type of hardware and/or software configured to facilitate users of the social media application to interact with and/or share content. In some embodiments, the request can be received at the social media application.

A plurality of consumer values are retrieved in response to the request (block 810). The plurality of consumer values can represent a plurality of interactions with the social media application via the consumer account during a time period occurring before the request is received. In some embodiments, the plurality of consumer values can be defined by at least a portion of the presentation module. In some embodiments, the plurality of consumer values can be retrieved from a presentation value database.

A subset of sharer content from the plurality of sharer content is selected based on the plurality of consumer values (block 820). The sharer content can include content shared by the sharer (via the sharer account) or any content associated with a social media account of the sharer. Although not shown in FIG. 8, in some embodiments, the subset of sharer content can be selected from the plurality of sharer content based on a variety of presentation values including the plurality of consumer values. In some embodiments, the subset of sharer content can be associated with a specified contextual category, can be associated with a time frame, and/or so forth.

A portion of a presentation customized for the consumer based on the plurality of consumer values and using the selected subset of sharer content is defined (block 830). In some embodiments, a format of the presentation can be customized for execution via the consumer account based on the plurality of consumer values. In some embodiments, the presentation can be customized using a presentation template, which is selected based on one or more presentation values including the consumer values.

Figure 9:
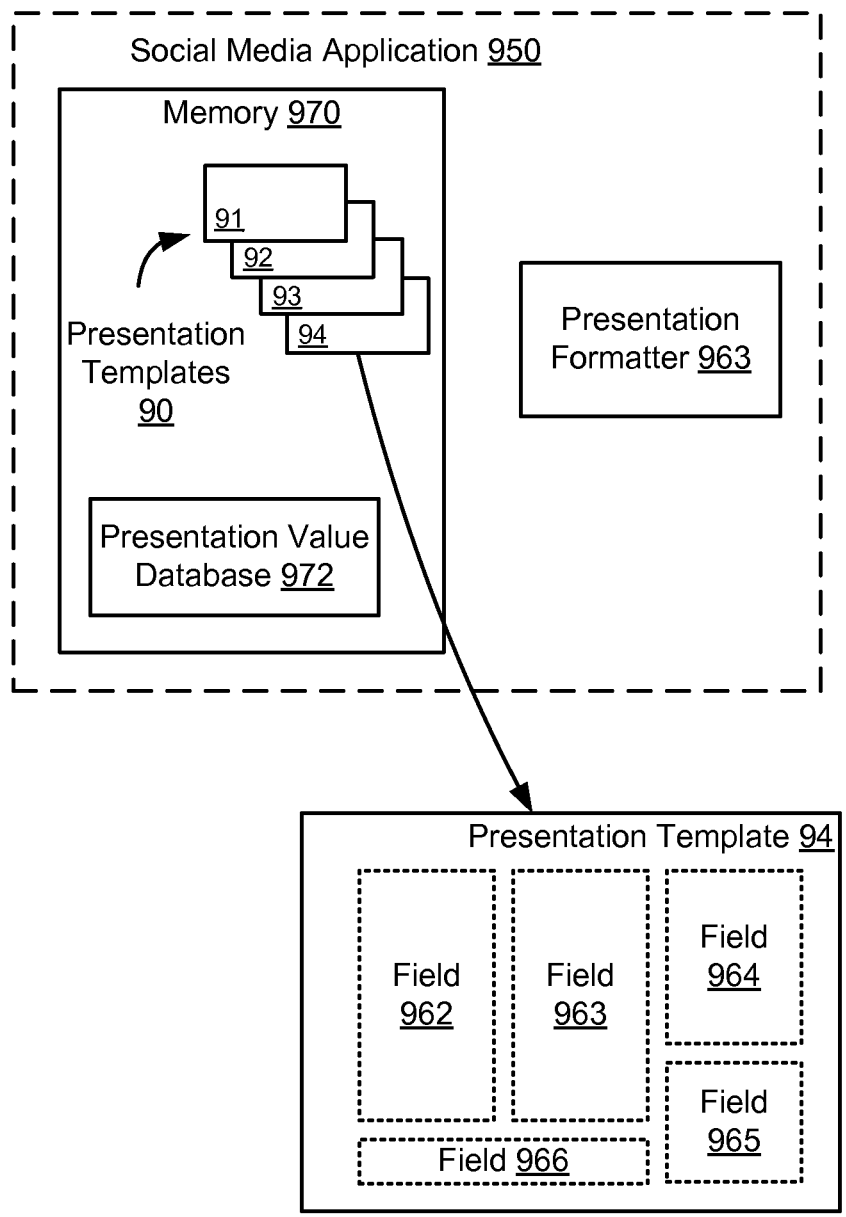
FIG. 9 is a block diagram that illustrates a presentation template retrieved from a memory of a social media application.

FIG. 9 is a block diagram that illustrates a presentation template 94 retrieved from a memory 970 associated with a social media application 950. In this embodiment, the presentation template 94 is selected by a presentation formatter 963 from presentation templates 90 (also can be referred to as a set or as a group of presentation templates) stored in the memory 970. In some embodiments, the set of presentation templates 90 can be referred to as a library of presentation templates.

As shown in FIG. 9, the presentation template 94 includes several fields, fields 962 through 966, into which at least a portion of sharer content can be included as part of a presentation customized for a consumer. A request for the presentation can be triggered by the consumer when accessing the sharer content using the social media application 950.

Although not shown in FIG. 9, the fields of the presentation template 94 can be configured for a specific type of content. For example, field 962 can be configured to receive image content and field 966 can be configured to receive audio content. In some embodiments, the presentation template 94 can have a specified style, a visual theme, a contextual theme, and/or so forth. For example, a background image associated with presentation template 94 can be configured for a particular visual or contextual theme. In some embodiments, one or more of the presentation templates 90 can have, or can include, for example, fields for animated moving images, a slideshow format, bullet points, textual themes, a chronologically-based format, and/or so forth.

The presentation formatter 963 can be configured to select the presentation template 94 from the presentation templates and 90 based on one or more presentation values stored in a presentation value database 972. For example, the presentation template 94 can be related to a first contextual category and the other presentation templates (i.e., presentation templates 91 through 93) can be related to a second contextual category. In response to a request for a presentation customized for a consumer, the presentation formatter 963 can be configured to receive a consumer value that indicates that the consumer has previously viewed content related to the first contextual category but has not previously viewed content related to the second contextual category. Based on this consumer value, the presentation formatter 963 can be configured to select the presentation template 94 from the set of presentation templates 90 as a basis for a format of the presentation customized for the consumer.

As another example, the presentation template 94 can be used to define a format of a presentation with a specified visual style. In response to a request for a presentation customized for a consumer, the presentation formatter 963 can be configured to receive a consumer value indicating that the consumer prefers viewing content or sharing content having the specified visual style. Based on this consumer value, the presentation formatter 963 can be configured to select the presentation template 94 from the set of presentation templates 90 as a basis for a format of the presentation customized for the consumer.

In some embodiments, one or more of the presentation templates 90 can be customized for a particular consumer. For example, at least a portion of the presentation template 94 can be defined by a sharer for use for a presentation for a consumer, and the presentation template 94 defined for the consumer can be stored in the memory 970 for later retrieval. The presentation template 94, even if customized for the consumer, can be used to define a customized presentation for another consumer.

Figure 10:
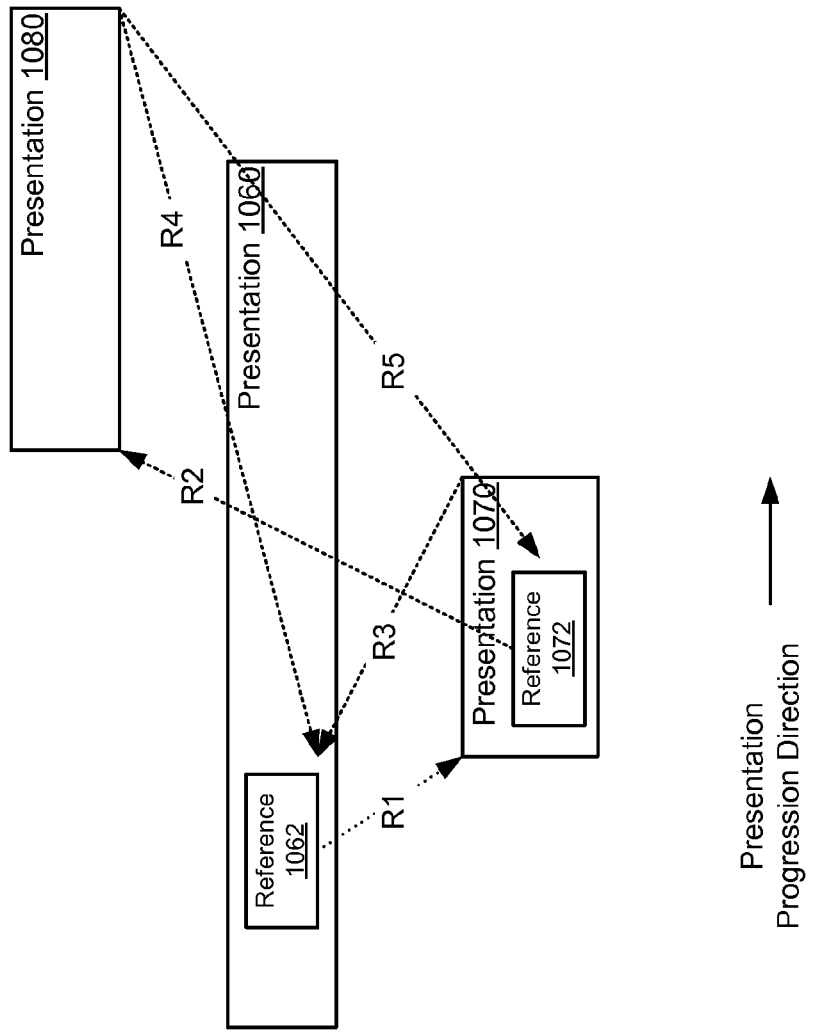
FIG. 10 is a block diagram that illustrates interactive presentations that can be defined using the social media application.

FIG. 10 is a block diagram that illustrates interactive presentations that can be defined using the social media application. As shown in FIG. 10, presentation progression direction is to the right. Presentation 1060 is an interactive presentation that includes a reference 1062, and presentation 1070 is also an interactive presentation that includes a reference 1072. Presentation 1080 is a presentation that does not include a reference to another presentation (and thus is not an interactive presentation). In this embodiment, presentation 1060 is a presentation defined with a customized format and content (not shown) for a consumer in response to a request for a presentation from the consumer. In some embodiments, presentation 1060, presentation 1070, and presentation 1080 can be portions of presentations.

In this embodiment, the reference 1062 is a link to presentation 1070, and the reference 1072 is a link to presentation 1080. Accordingly, when the reference 1062 is accessed (e.g., selected, triggered), for example, by a consumer during execution (e.g., consumption) of the presentation 1060, execution of the presentation 1070 is triggered (as represented by arrow R1). In some embodiments, when execution of the presentation 1070 is triggered, execution of the presentation 1060 is suspended or terminated. Also, when the reference 1072 is access, for example, by a consumer during execution of the presentation 1070, execution of the presentation 1080 is triggered (as represented by arrow R2). In some embodiments, when execution of the presentation 1080 is triggered, execution of the presentation 1070 is suspended or terminated. Thus, accessing the references within the presentations causes redirection to another presentation (or portion thereof).

For example, at least a portion (e.g., a portion within a composition time window) of presentation 1060 can be defined in response to a request for a presentation customized for a consumer. The presentation 1060 can be sent for consumption by the consumer, and the consumer can access reference 1062 during execution (e.g., consumption) of the presentation 1060. In response to accessing the reference 1062, the presentation 1060 can be suspended and execution of presentation 1070 can be triggered. In some embodiments, presentation 1070 can be defined in response to the reference 1062 being accessed so that the presentation 1070 can be executed. At the end of execution of the presentation 1070, execution of presentation 1060 can be resumed (as represented by arrow R3). In some embodiments, execution of presentation 1060 can be resumed at a portion of the presentation 1060 including the reference 1062, or execution of presentation 1060 can be resumed at a different portion of the presentation 1060. Alternatively, reference 1072 included in presentation 1070 can be accessed by the consumer during execution of presentation 1070. In response to accessing the reference 1070, execution of the presentation 1070 can be suspended and execution of presentation 1080 can be triggered (as represented by arrow R2). At the end of presentation 1080, execution of presentation 1060 can be resumed at a portion of the presentation 1060 including the reference 1062 (or a different portion) (as represented by arrow R4), or execution of presentation 1070 of a portion of the presentation 1070 including the reference 1072 (or a different portion) can be resumed (as represented by arrow R5).

In some embodiments, one or more of the presentations can be dynamically defined as a consumer navigates through each of the presentations. Thus, only portions of the presentations that are being consumed or triggered for consumption may be defined. In some embodiments, presentation 1060, presentation 1070, and presentation 1080 can each be portions of a single interactive presentation that is dynamically defined. Thus, presentation 1060, presentation 1070, and presentation 1080 can collectively define a single presentation. In some embodiments, one or more of the presentations can be interactively consumed. For example, consumption of the presentation can be paused, consumed again, stopped, stored for later consumption, tagged, forwarded to another consumer, and/or so forth.

In some embodiments, the reference 1062 can be associated with a specified sharer content of the presentation 1060, and the presentation 1070 can be additional sharer content (or other content (e.g., third-party content, consumer content)) associated with the specified sharer content. For example, the reference 1062 in the presentation 1060 can be associated with sharer content that is included in a specified contextual category. The presentation 1070 can be customized for the consumer with additional content (e.g., sharer content, third-party content) included in the specified contextual category. Thus, the consumer of the sharer content, if particularly interested in sharer content associated with the contextual category, can be redirected to presentation 1070 that includes additional content associated with the specified contextual category by accessing the reference 1062.

In some embodiments, one or more references can be included in one or more presentations by a linking module such as linking module 265 shown in FIG. 2. A linking module can be configured to include one or more references in a presentation based on one or more presentation values stored in, for example, a presentation value database. For example, in response to a request for a presentation for a consumer, a presentation module can be configured to define a presentation that includes sharer content and/or a format customized for the consumer. The sharer content can be associated with a specified contextual category as represented by a content value. Based on the content value, a linking module can be configured to include a reference in the presentation to additional content associated with the specified contextual category.

In some embodiments, one or more references can be configured to trigger execution of another portion of a presentation. For example, a reference included in the first portion of the presentation that is accessed during execution (e.g., consumption) of the first portion of the presentation can trigger execution of a second portion of the presentation (that may or may not be adjacent to the first portion of the presentation). Execution of the first portion of the presentation can be suspended in response to the reference being accessed. In some embodiments, triggering of execution of the second portion of the presentation can be triggered in a fashion that a consumer the presentation may not perceive that the first portion of the presentation has been suspended and that execution of a new portion of the presentation (i.e., the second portion of the presentation) has been initiated. Specifically, when the reference included in the first portion of the presentation is accessed, the second portion of the presentation (which is started in response to the reference being accessed) can be combined using a transition (e.g., a smooth transition) with the first portion of presentation that is suspended.

Figure 11:
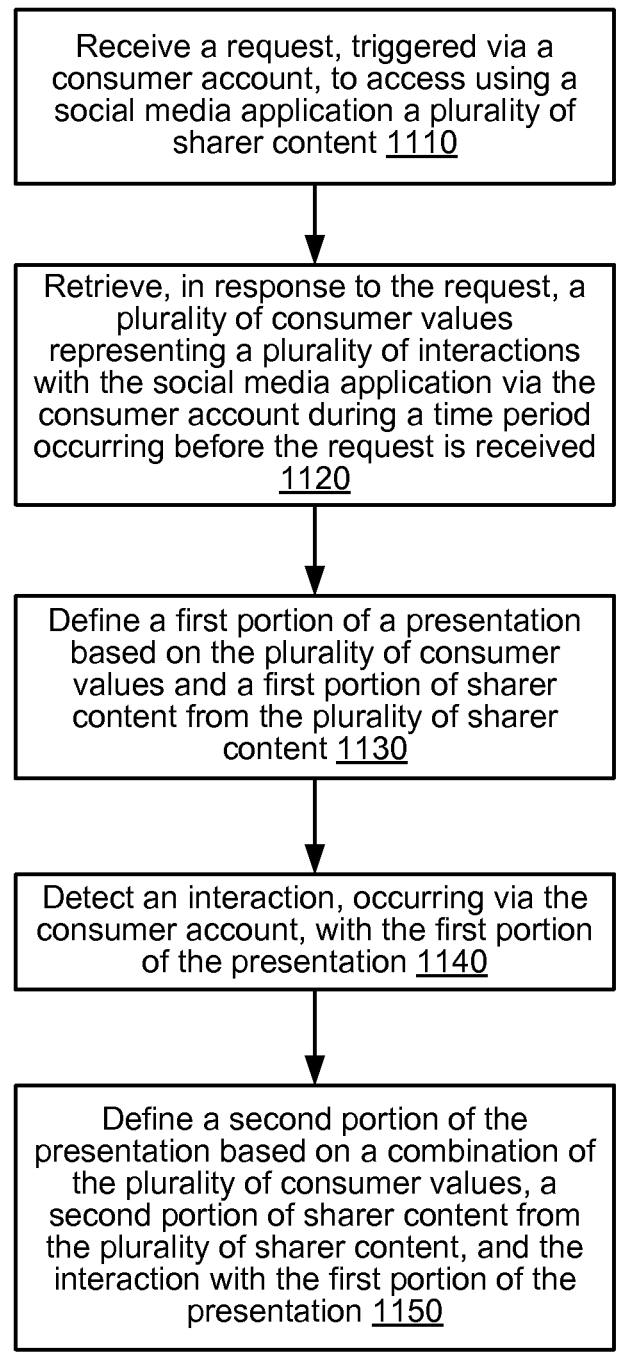
FIG. 11 is a flowchart that illustrates a method for interactively defining a presentation.

FIG. 11 is a flowchart that illustrates a method for interactively defining a presentation. As shown in FIG. 11, a request, triggered via a consumer account, to access a plurality of sharer content using a social media application is received. (block 1110) The sharer content can be associated with a sharer account (by a sharer) via a sharer device using the social media application. The social media application can be, or can include, any type of hardware and/or software configured to facilitate users of the social media application to interact and/or share content. In some embodiments, the request can be received at the social media application.

A plurality of consumer values are retrieved in response to the request (block 1120). The plurality of consumer values represent a plurality of interactions with the social media application via the consumer account (by the consumer) during a time period occurring before the request is received. In some embodiments, the plurality of consumer values can be defined by at least a portion of the presentation module. In some embodiments, the plurality of consumer values can be retrieved from a presentation value database.

A first portion of a presentation is defined based on the plurality of consumer values and a first portion of sharer content from the plurality of sharer content (block 1130). In some embodiments, a format of the first portion of sharer content within the presentation can be defined based on the plurality of consumer values. The first portion of sharer content can include content shared by the sharer or any content associated with a social media account of the sharer. Although not shown in FIG. 11, in some embodiments, the first portion of sharer content can be selected from the plurality of sharer content based on a variety of presentation values including the plurality of consumer values. In some embodiments, the first portion of sharer content can be associated with a specified contextual category, can be associated with a time frame, and/or so forth.

An interaction, occurring via the consumer account, with the first portion of the presentation is detected (block 1140). In some embodiments, the interaction of concern with the first portion of the presentation can be an interaction with a reference included in the first portion of presentation. In some embodiments, reference can be included in the first portion of the presentation by a linking module such as linking module 265 shown in FIG. 2.

A second portion of the presentation is defined based on a combination of the plurality of consumer values, a second portion of sharer content from the plurality of sharer content, and the interaction with the first portion of the presentation (block 1150). In some embodiments, a format of the first portion of sharer content within the presentation can be defined based on the plurality of consumer values. The first portion of sharer content can include content shared by the sharer (via the sharer account) or any content associated with a social media account of the sharer. Although not shown in FIG. 11, in some embodiments, the first portion of sharer content can be selected from the plurality of sharer content based on a variety of presentation values including the plurality of consumer values. In some embodiments, the first portion of sharer content can be associated with a specified contextual category, can be associated with a time frame, and/or so forth.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:
   a presentation module configured to receive a request, triggered via a first consumer account, to access using a social media application a plurality of sharer content posted to a sharer account of the social media application;
   a relationship module configured to identify a first relationship value representing a first type of relationship between a first consumer of the first consumer account and a sharer of the sharer account within a social network associated with the sharer account,
   the relationship module configured to identify a second relationship value representing a second type of relationship between a second consumer of a second consumer account and the sharer; and
   a presentation composition module configured to select a first subset of sharer content from the plurality of sharer content based on the first relationship value, and configured to define a configuration of the first subset of sharer content customized for the first consumer within a portion of a first presentation based on the first relationship value,
   the presentation composition module configured to select a second subset of sharer content from the plurality of sharer content based on the second relationship value, and configured to define a configuration of the second subset of sharer content customized for the second consumer within a portion of a second presentation based on the second relationship value.

2. The computer system of claim 1, wherein the portion of the first presentation is a first portion of the first presentation having a duration corresponding to a duration of a composition time window, the presentation module is configured to trigger streaming of the first portion of the first presentation to a consumer device, the presentation composition module is configured to define, before streaming of the first portion of the first presentation has been completed, a second portion of the first presentation having a duration corresponding to the duration of the composition time window.

3. The computer system of claim 1, wherein the relationship module is configured to define a characteristic of the first type of relationship between the consumer of the consumer account and the sharer of the sharer account based on the social network associated with the sharer account, the social network is defined by a plurality of relationships between a plurality of users of the social media application including the first consumer and the sharer, the first relationship value represents the characteristic of the first type of relationship.

4. The computer system of claim 1, further comprising:
a consumer module configured to retrieve, in response to the request, a plurality of consumer values representing a plurality of interactions with the social media application via the first consumer account during a time period occurring before the request is received,
the presentation module is configured to define the configuration of the first subset of sharer content within the portion of the first presentation based on the plurality of consumer values,
the portion of the presentation is a first portion of the first presentation, the presentation composition module is configured to define a second portion of the first presentation in response to a reference included in the first portion of the first presentation being accessed via the first consumer account during execution of the first portion of the first presentation.

5. The computer system of claim 1, wherein the selecting of at least a portion of the first subset of sharer content is based on the first relationship value representing a strength of the first type of relationship between the first consumer and the sharer, the strength of the first type of relationship is correlated to interactions between the first consumer account and the sharer account.

6. The computer system of claim 1, wherein the presentation module is configured to select the first subset of sharer content based on a contextual category assigned to the first subset of the sharer content from the plurality of sharer content.

7. A method, comprising:
receiving a request, triggered via a first consumer account, to access, using a social media application, a plurality of sharer content, the sharer content associated with a sharer account using the social media application;
retrieving, in response to the request, a consumer value and a first relationship value, the consumer value representing an interaction with the social media application via the consumer account, the first relationship value characterizing a first relationship between a first consumer of the first consumer account and a sharer of the sharer account;
selecting a first subset of sharer content from the plurality of sharer content based on a combination of the consumer value and the first relationship value;
defining a portion of a first presentation customized for the first consumer account using the selected first subset of sharer content;
selecting a second subset of sharer content from the plurality of sharer content based on a second relationship value characterizing a second relationship between a second consumer of a second consumer account and the sharer of the sharer account; and
defining a portion of a second presentation customized for the second consumer account using the selected second subset of sharer content.

8. The method of claim 7, wherein the first relationship value represents a strength of the first relationship between the first consumer and the sharer, the strength of the first relationship is based on common relationships associated with the first consumer and the sharer within a social network.

9. The method of claim 7, wherein the first relationship value represents a strength of the first relationship between the first consumer and the sharer.

10. The method of claim 7, wherein the first relationship value represents a type of the first relationship between the first consumer and the sharer, the type of the first relationship includes at least one of a friend relationship, a business relationship, an acquaintance relationship, or a family relationship.

11. The method of claim 7, wherein the first relationship value is defined based on a social network associated with the sharer account, the social network is defined by a plurality of relationships between a plurality of users of the social media application including the first consumer and the sharer.

12. The method of claim 7, further comprising:
selecting a presentation template from a plurality of presentation templates based on the consumer value and the first relationship value, the portion of the first presentation has at least one of a visual configuration or an audio configuration based on the presentation template.

13. The method of claim 7, further comprising:
associating a first portion of the first subset of sharer content with a first contextual category and a second portion of the first subset of sharer content with a second contextual category different from the first contextual category,
the selecting includes selecting the first portion of the first subset of the sharer content based on a relationship between the consumer value and the first contextual category, and the selecting includes selecting the second portion of the first subset of the sharer content based on a relationship between the consumer value and the second contextual category.

14. A non-transitory computer-readable storage medium storing code representing instructions that when executed are configured to cause a processor to perform a process, the code comprising code to:
receive a request, triggered via a first consumer account, to access using a social media application a plurality of sharer content associated with a sharer account of the social media application;
access, in response to the request, a first relationship value representing a first relationship between a first consumer of the first consumer account and a sharer of the sharer account within a social network associated with the sharer account, the first relationship being defined via the sharer account;
select a first subset of sharer content from the plurality of sharer content based on the first relationship value;
access a second relationship value representing a second relationship between a second consumer of a second consumer account and the sharer of the sharer account, the second relationship being defined via the sharer account;
select a second subset of sharer content from the plurality of sharer content based on the second relationship value.

15. The non-transitory computer-readable storage medium of claim 14, wherein the first relationship value represents a type of the first relationship between the first consumer and the sharer, the type of the first relationship includes at least one of a friend relationship, a business relationship, an acquaintance relationship, or a family relationship.

16. The non-transitory computer-readable storage medium of claim 14, further comprising code to:
   define a configuration of the first subset of sharer content within a portion of a presentation based on the first relationship value.

17. The non-transitory computer-readable storage medium of claim 14, wherein the first relationship value is defined via the sharer account.

18. The non-transitory computer-readable storage medium of claim 14, further comprising code to:
   define a configuration of the first subset of sharer content within a portion of a presentation based on the first relationship value, the presentation being a streamed presentation modified based on an interaction via the consumer account.

19. The non-transitory computer-readable storage medium of claim 14, further comprising code to:
   define a configuration of the first subset of sharer content within a portion of a presentation based on the first relationship value, the presentation being a static presentation.

* * * * *